(12) United States Patent
Burckhardt

(10) Patent No.: US 8,088,244 B2
(45) Date of Patent: *Jan. 3, 2012

(54) MOISTURE-HARDENED POLYURETHANE COMPOSITIONS CONTAINING COMPOUNDS COMPRISING ALDIMINE

(75) Inventor: Urs Burckhardt, Zürich (CH)

(73) Assignee: Sika Technology AG, Baar (CH)

( * ) Notice: Subject to any disclaimer, the term of this patent is extended or adjusted under 35 U.S.C. 154(b) by 811 days.

This patent is subject to a terminal disclaimer.

(21) Appl. No.: 11/992,130

(22) PCT Filed: Sep. 29, 2006

(86) PCT No.: PCT/EP2006/066927
§ 371 (c)(1),
(2), (4) Date: Apr. 30, 2008

(87) PCT Pub. No.: WO2007/036574
PCT Pub. Date: Apr. 5, 2007

(65) Prior Publication Data
US 2009/0159204 A1    Jun. 25, 2009

(30) Foreign Application Priority Data
Sep. 30, 2005  (EP) .................... 05109112

(51) Int. Cl.
*C04B 37/00* (2006.01)
*C09J 4/00* (2006.01)
*C09J 101/00* (2006.01)
*C09J 201/00* (2006.01)

(52) U.S. Cl. .............. 156/325; 156/331.1; 525/454

(58) Field of Classification Search .......... 156/331.1, 156/325; 525/454
See application file for complete search history.

(56) References Cited

U.S. PATENT DOCUMENTS

| | | | |
|---|---|---|---|
| 3,420,800 A | 1/1969 | Haggis | |
| 3,632,557 A | 1/1972 | Brode et al. | |
| 3,971,751 A | 7/1976 | Isayama et al. | |
| 4,108,842 A | 8/1978 | Konig et al. | |
| 4,345,053 A | 8/1982 | Rizk et al. | |
| 4,404,379 A | 9/1983 | Hajek et al. | |
| 4,469,831 A | 9/1984 | Bueltjer et al. | |
| 4,853,454 A | 8/1989 | Merger et al. | |
| 5,087,661 A | 2/1992 | Aoki et al. | |
| 5,990,257 A | 11/1999 | Johnston et al. | |
| 6,136,942 A | 10/2000 | Pfenninger et al. | |
| 6,207,766 B1 | 3/2001 | Doi et al. | |
| 7,741,425 B2 * | 6/2010 | Burckhardt et al. | 528/44 |
| 2005/0065276 A1 * | 3/2005 | Burckhardt et al. | 524/589 |
| 2006/0122352 A1 | 6/2006 | Burckhardt | |

FOREIGN PATENT DOCUMENTS

| | | |
|---|---|---|
| EP | 0 403 921 A2 | 12/1990 |
| EP | 0 469 751 A1 | 2/1992 |
| EP | 1 384 735 A1 | 1/2004 |
| EP | 1 524 282 A1 | 4/2005 |
| WO | WO 2004/013200 A1 | 2/2004 |
| WO | WO 2004/056905 A1 | 7/2004 |

OTHER PUBLICATIONS

Houben-Weyl, *Methods of Organic Chemistry*, vol. X1/2, pp. 73-99, Published 1994.

Houben-Weyl, *Methods of Organic Chemistry*, vol. VIII, pp. 516-528, Published 1987.

* cited by examiner

*Primary Examiner* — James Sells
*Assistant Examiner* — Michael Orlando
(74) *Attorney, Agent, or Firm* — Oliff & Berridge, PLC

(57) ABSTRACT

The invention relates to compositions which contain at least one isocyanate-containing polyurethane polymer P, which is produced from at least one polyisocyanate and at least one polyol, in addition to at least one aldimine-containing compound of formula (I). The compositions are stable during storage and harden quickly under the influence of moisture, are non-porous and do no not separate rich substances. Said compositions, the hardened compositions, and the resulting separated products are odor-less. The compositions can be used as an adhesive, sealant or coating which exhibit good mechanical properties and adhesion.

21 Claims, No Drawings

MOISTURE-HARDENED POLYURETHANE COMPOSITIONS CONTAINING COMPOUNDS COMPRISING ALDIMINE

FIELD OF THE INVENTION

The invention relates to the field of the aldimines and of the moisture-curing polyurethane polymers.

PRIOR ART

Polyurethane compositions are plastic precursors which have been used for a long time, for example as adhesives, sealants, coatings and coverings. Usually, they contain an isocyanate-containing polyurethane polymer which was prepared from polyols and polyisocyanates and which is mixed with further components and stored in the absence of moisture until use. Such a composition is referred to as a one-component composition and cures under the influence of moisture to give a plastic. These systems known per se have the disadvantage that, owing to the carbon dioxide ($CO_2$) forming in the reaction of the isocyanate groups with water, the formation of undesired gas bubbles in the cured plastic may occur during their curing; this occurs in particular when the rate of the curing is high. For suppressing bubble formation during the curing of isocyanate-containing compositions, blocked amines, for example in the form of aldimines, can be added as so-called "latent amines" or as "latent curing agents" to the compositions. On contact with moisture, the blocked amino groups of the latent curing agent hydrolyze and then react with the isocyanate groups of the composition without liberating $CO_2$. The use of aldimines as latent curing agents in isocyanate-containing compositions is described, for example, in U.S. Pat. No. 3,420,800. However, the presence of an aldimine entails the danger that the composition has only a short shelf-life or is not stable at all on storage, owing to premature reactions between aldimino and isocyanate groups.

Isocyanate-containing compositions containing aldimines and having a long shelf-life are known, as described, for example, in U.S. Pat. No. 4,469,831, U.S. Pat. No. 4,853,454 and U.S. Pat. No. 5,087,661. WO 2004/013200 A1 describes compositions which contain polyaldimines, have a long shelf-life and cure without odor under the influence of moisture. The compositions described in said publications have a disadvantage that they require a relatively large amount of water for curing, namely twice as much as when the isocyanate-containing polyurethane polymer present in the composition cures without the latent curing agent, i.e. by direct reaction of the isocyanate groups with water. In the case of curing by means of atmospheric humidity, the composition cures from the outside toward the inside, the water required for the curing reaction having to diffuse through the plastic layer which becomes increasingly thick; the availability of water therefore constitutes after only a short time the factor limiting the progress of the curing reaction, especially in the case of application of the composition in thick layers. A higher water consumption of the crosslinking reactions leading to curing therefore automatically leads to slower curing.

Isocyanate-containing compositions which require less water for curing than the abovementioned systems are known. Thus, U.S. Pat. No. 4,108,842, U.S. Pat. No. 4,404,379 and U.S. Pat. No. 6,136,942 describe compositions which contain the reaction products of polyisocyanates and amino functional aldimines, or cycloaminals as a tautomeric form thereof, and which cure rapidly under the influence of moisture and can be used, for example, as adhesives, sealants or coatings. However, the compositions described in said publications have a short shelf-life. This is because the protected amino groups present in them, in the form of aldimino or cycloaminal groups, are not completely inert to isocyanate groups but react gradually with these, in particular with the reactive aromatic isocyanate groups, even in the absence of moisture, and thus cause an increase in viscosity which may make the compositions unusable after only a short time. Furthermore, the compositions have a troublesome odor during their use, caused by the aldehydes liberated during the curing—by hydrolysis of the aldimino groups—and can therefore be used only to a limited extent, particularly in interior rooms. Compositions according to U.S. Pat. No. 6,136,942 also show problems with light fastness in the cured form.

SUMMARY OF THE INVENTION

It is therefore an object of the present invention to provide compositions which have a long shelf-life, cure rapidly and without bubbles under the influence of moisture, cause no odor development during curing and are suitable as plastic precursors. Surprisingly, it has been found that aldimine-containing compounds as claimed in claim 1 achieve this object.

These compositions have an excellent shelf-life. Under the influence of moisture, they cure rapidly without formation of bubbles and without odor development. They are suitable as plastic precursors, in particular for use as adhesives, sealants, coatings and coverings, which can also be used for applications requiring freedom from odor, such as, for example, for adhesive bonds, seals, coatings or floor coverings in the interior of vehicles or buildings, and which have excellent properties, in particular high green strength. Further embodiments form the subject of further independent claims. Further advantageous developments of the invention are evident from the subclaims.

DESCRIPTION OF THE PREFERRED EMBODIMENTS

The invention relates to compositions which contain at least one isocyanate-containing polyurethane polymer P and at least one aldimine-containing compound of the formula (I). The isocyanate-containing polyurethane polymer P is prepared here from at least one polyisocyanate and at least one polyol.

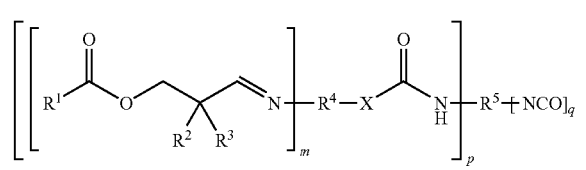

(I)

In formula (I), m is an integer from 1 to 4, p is an integer from 1 to 6 and q is an integer from 0 to 5, with the proviso that the sum of p and q has a value of from 2 to 6. Furthermore, $R^1$ is either a monovalent hydrocarbon radical having 6 to 30 C atoms, which optionally has at least one heteroatom, in particular in the form of ether oxygen, or $R^1$ is a substituent of the formula (II).

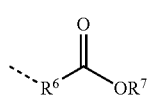

Here, $R^6$ is a divalent hydrocarbon radical having 2 to 20 C atoms, which optionally has at least one heteroatom, in particular in the form of ether oxygen. $R^7$ is a monovalent hydrocarbon radical having 1 to 20 C atoms.

Furthermore, $R^2$ and $R^3$ are either two substituents independent of one another, which in each case are a monovalent hydrocarbon radical having 1 to 12 C atoms, or $R^2$ and $R^3$ together form a single substituent which is a divalent hydrocarbon radical having 4 to 20 C atoms, which is part of a carbocyclic ring having 5 to 8, preferably 6, C atoms. This carbocyclic ring can if necessary be substituted. Furthermore, $R^4$ is an (m+1)-valent hydrocarbon radical having 2 to 12 C atoms, which optionally contains at least one heteroatom, in particular in the form of ether oxygen or tertiary amine nitrogen.

Furthermore, $R^5$ is either a (p+q)-valent organic radical. Such a radical optionally contains heteroatoms and can be obtained by removal of p+q NCO groups from $R^5$—$[NCO]_{p+q}$. Or $R^5$ is N, $NR^{14}$, O, OC(O)O, Si, $P(O)O_3$ or $SO_2$. Here, $R^{14}$ is a monovalent hydrocarbon radical having 1 to 20 C atoms.

Furthermore, X is O, S or N—$R^8$, $R^8$ here being either a monovalent hydrocarbon radical having 1 to 20 C atoms, which optionally has at least one carboxylic acid ester, nitrile, nitro, phosphonic acid ester, sulfone or sulfonic acid ester group, or being a substituent of the formula (III).

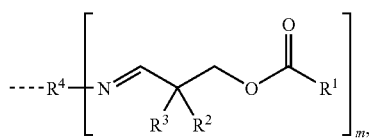

The dashed lines in the formulae represent the bonds to the stated substituents.

The aldimine-containing compound of the formula (I) can be prepared by the reaction of at least one aldimine of the formula (XI) containing an active hydrogen with at least one polyisocyanate D. That reactive group of the aldimine of the formula (XI) which carries the active hydrogen reacts in an addition reaction with one or more isocyanate groups of the polyisocyanate D to give an aldimine-containing compound of the formula (I), also referred to below as "adduct". In the present document, the term "active hydrogen" designates a deprotonatable hydrogen atom bonded to a nitrogen, oxygen or sulfur atom. The term "reactive group containing an active hydrogen" designates a functional group having an active hydrogen, in particular a primary or secondary amino group, a hydroxyl group, a mercapto group or a urea group. Attributes of substances, such as "aldimine-containing" or "isocyanate-containing", indicate that the designated functional groups, i.e. aldimino groups or isocyanate groups, are present in the substances. The prefix "poly" is substance designations, such as "poly-aldimine", "polyamine", "poly-isocyanate" or "polyol", indicates in the present document that the respective substance formally contains more than one functional group occurring in their designation per molecule.

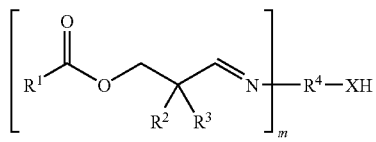

$R^1$, $R^2$, $R^{34}$, $R^4$ and X and m have the meanings already disclosed for the aldimine-containing compound of the formula (I).

The aldimine of the formula (XI) can be prepared from at least one sterically hindered aliphatic aldehyde A and at least one aliphatic amine B, corresponding to the formula $[H_2N]_m$—$R^4$—XH, which, in addition to one or more primary amino groups, also has a further reactive group containing an active hydrogen.

The reaction between the aldehyde A and the amine B takes place in a condensation reaction with elimination of water. Such condensation reactions are very well known and are described, for example, in Houben-Weyl, "Methoden der organischen Chemie [Methods of Organic Chemistry]", vol. XI/2, page 73 et seq. Here, the aldehyde A is used stoichiometrically or in stoichiometric excess relative to the primary amino groups of the amine B. Usually, such condensation reactions are carried out in the presence of a solvent, by means of which water forming in the reaction is removed azeotropically. For the preparation of the aldimines of the formula (XI), however, a preparation process without the use of solvents is preferred, the water formed in the condensation being removed from the reaction mixture directly by application of a vacuum. Owing to the solvent-free preparation, there is no need to distil off the solvent after the preparation is complete, which simplifies the preparation process. In addition, the aldimine is thus free of solvent residues which might cause a troublesome odor.

For the preparation of the aldimine of the formula (XI), at least one sterically hindered aliphatic aldehyde A of the formula (IV) is used.

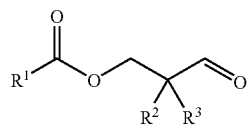

In the formula (IV), $R^1$, $R^2$ and $R^3$ have the same meaning as for formula (I).

The aldehyde A is odorless. An "odorless" substance is understood as meaning a substance which has such little odor that it cannot be smelt by most human individuals, i.e. cannot be perceived with the nose.

The aldehyde A is prepared, for example, from a carboxylic acid $R^1$—COOH and a β-hydroxyaldehyde of the formula (V) in an esterification reaction. This esterification can be effected by known methods, described, for example, in Houben-Weyl, "Methoden der organischen Chemie [Methods of Organic Chemistry]", vol. VIII, pages 516-528. The β-hydroxyaldehyde of the formula (V) is obtained, for example, in a crossed aldol addition from formaldehyde (or oligomeric forms of formaldehyde, such as paraformaldehyde or 1,3,5-trioxane) and an aldehyde of the formula (VI).

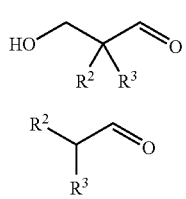

In the formulae (V) and (VI), $R^2$ and $R^3$ have the same meaning as for formula (I).

The preparation of the aldehyde A preferably takes place in the absence of a solvent. The β-hydroxy-aldehyde of the formula (V) is reacted directly with the carboxylic acid without the use of solvents, the water formed in the esterification being removed in vacuo. It is furthermore preferred to carry out the aldol and esterification reactions leading to the aldehyde A from the parent substances in a common process step, as a one-pot reaction.

The following may be mentioned, for example, as suitable carboxylic acids $R^1$—COOH for the esterification with the β-hydroxyaldehydes of the formula (V): saturated aliphatic carboxylic acids, such as enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid; monounsaturated aliphatic carboxylic acids, such as palmitoleic acid, oleic acid, erucic acid; polyunsaturated aliphatic carboxylic acids, such as linoleic acid, linolenic acid, elaeostearic acid, arachidonic acid; cycloaliphatic carboxylic acids, such as cyclohexanecarboxylic acid; arylaliphatic carboxylic acids, such as phenylacetic acid; aromatic carboxylic acids, such as benzoic acid, naphthoic acid, toluic acid, anisic acid; isomers of these acids; fatty acid mixtures from the industrial saponification of natural oils and fats, such as, for example, rapeseed oil, sunflower oil, linseed oil, olive oil, coconut oil, oil palm kernel oil and oil palm oil; and monoalkyl and monoaryl dicarboxylates, as obtained from the monoesterification of dicarboxylic acids, such as succinic acid, glutaric acid, adipic acid, pimelic acid, suberic acid, azelaic acid, sebacic acid, 1,12-dodecanedioic acid, maleic acid, fumaric acid, hexahydrophthalic acid, hexahydroisophthalic acid, hexahydroterephthalic acid, 3,6,9-trioxaundecanedioic acid and similar derivatives of polyethylene glycol, with alcohols, such as methanol, ethanol, propanol, butanol, higher homologues and isomers of these alcohols.

Caprylic acid, capric acid, lauric acid, myristic acid, palmitic acid, stearic acid, oleic acid, linoleic acid, linolenic acid, the isomers of these acids and industrial mixtures of fatty acids which contain these acids are preferred. Lauric acid is particularly preferred.

Suitable aldehydes of the formula (VI) for reaction with formaldehyde to give β-hydroxyaldehydes of the formula (V) are, for example, isobutyraldehyde, 2-methylbutyraldehyde, 2-ethylbutyraldehyde, 2-methyl-valeraldehyde, 2-ethylcapronaldehyde, cyclopentane-carboxaldehyde, cyclohexanecarboxaldehyde, 1,2,3,6-tetrahydrobenzaldehyde, 2-methyl-3-phenylpropion-aldehyde, 2-phenylpropionaldehyde and diphenyl-acetaldehyde. Isobutyraldehyde is preferred.

Suitable β-hydroxyaldehydes of the formula (V) are, for example, the products from the reaction of formaldehyde with the aldehydes of the formula (VI) which are mentioned above as being suitable. 3-Hydroxypival-aldehyde is preferred.

The amine B is an aliphatic amine which, in addition to one or more primary amino groups, also has a further reactive group which contains an active hydrogen. In the present document, the term "primary amino group" designates an $NH_2$ group which is bonded to an organic radical, while the term "secondary amino group" designates an NH group which is bonded to two organic radicals. The term "aliphatic amine" designates compounds which contain at least one amino group which is bonded to an aliphatic, cycloaliphatic or arylaliphatic radical. They thus defer from the aromatic amines in which the amino group is bonded directly to an aromatic radical, such as, for example, in aniline or 2-aminopyridine.

For example, the compounds mentioned below are suitable as amines B:

aliphatic hydroxyamines, such as 2-aminoethanol, 2-methylaminoethanol, 1-amino-2-propanol, 3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol, 10-amino-1-decanol, 12-amino-1-dodecanol, 4-(2-amino-ethyl)-2-hydroxyethylbenzene, 3-aminomethyl-3,5,5-tri-methylcyclohexanol; glycol derivatives carrying a primary amino group, such as diethylene glycol, dipropylene glycol, dibutylene glycol and higher oligomers and polymers of these glycols, for example 2-(2-aminoethoxy)ethanol, triethylene glycol monoamine, α-(2-hydroxymethylethyl)-ω-(2-aminomethylethoxy)poly-(oxy(methyl-1,2-ethanediyl)); derivatives of poly-alkoxylated trihydric or higher-hydric alcohols or of polyalkoxylated diamines, which derivatives carry a hydroxyl group and one or more primary amino groups; products of the monocyanoethylation and subsequent hydrogenation of glycols, for example 3-(2-hydroxyethoxy)propylamine, 3-(2-(2-hydroxyethoxy)ethoxy)propylamine, 3-(6-hydroxy-hexyloxy)propylamine;

aliphatic mercaptoamines, such as 2-aminoethanethiol (cysteamine), 3-aminopropanethiol, 4-amino-1-butanethiol, 6-amino-1-hexanethiol, 8-amino-1-octanethiol, 10-amino-1-decanethiol, 12-amino-1-dodecanethiol; aminothio sugars, such as 2-amino-2-deoxy-6-thio-glucose;

difunctional or polyfunctional aliphatic amines which, in addition to one or more primary amino groups, carry a secondary amino group, such as N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, 4-aminomethylpiperidine, 3-(4-aminobutyl)piperidine, N-aminoethylpiperazine, diethylenetriamine (DETA), bishexamethylenetriamine (BHMT); di- and triamines from the cyanoethylation or cyanobutylation of primary mono- and diamines, for example N-methyl-1,3-propanediamine, N-ethyl-1,3-propanediamine, N-butyl-1,3-propanediamine, N-hexyl-1,3-propanediamine, N-(2-ethylhexyl)-1,3-propane-diamine, N-dodecyl-1,3-propanediamine, N-cyclohexyl-1,3-propanediamine, 3-methylamino-1-pentylamine, 3-ethylamino-1-pentylamine, 3-butylamino-1-pentylamine, 3-hexylamino-1-pentylamine, 3-(2-ethylhexyl)amino-1-pentylamine, 3-dodecylamino-1-pentylamine, 3-cyclo-hexylamino-1-pentylamine, dipropylenetriamine (DPTA), N3-(3-aminopentyl)-1,3-pentanediamine, N5-(3-amino-propyl)-2-methyl-1,5-pentanediamine, N5-(3-amino-1-ethylpropyl)-2-methyl-1,5-pentanediamine, and fatty diamines, such as N-cocoalkyl-1,3-propanediamine, N-oleyl-1,3-propanediamine, N-soyaalkyl-1,3-propane-diamine, N-tallowalkyl-1,3-propanediamine or N—($C_{16-22}$-alkyl)-1, 3-propanediamine, as are obtainable, for example, under the trade name Duomeen® from Akzo Nobel; the products from the Michael-like addition of aliphatic primary di- or polyamines with acrylonitrile, diesters of maleic or fumaric acid, diesters of citraconic acid, esters of acrylic and methacrylic acid and diesters of itaconic acid, reacted in the molar ratio 1:1;

trisubstituted ureas which carry one or more primary amino groups, such as N-(2-aminoethyl)ethyleneurea, N-(2-aminoethyl)propyleneurea or N-(2-aminoethyl)-N'-methylurea.

Particularly suitable aliphatic hydroxy- and mercaptoamines are those in which the primary amino group are separated from the hydroxyl or the mercapto group by a chain of at least 5 atoms, or by a ring, such as, for example, in 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-trimethyl-cyclohexanol, 2-(2-aminoethoxy)ethanol, triethylene glycol monoamine, α-(2-hydroxymethylethyl)-ω-(2-amino-methylethoxy)poly(oxy(methyl-1,2-ethanediyl)), 3-(2-hydroxyethoxy)propylamine, 3-(2-(2-hydroxyethoxy)-ethoxy)propylamine, 3-(6-hydroxyhexyloxy)propylamine, 6-amino-1-hexanethiol, 8-amino-1-octanethiol, 10-amino-1-decanethiol and 12-amino-1-dodecanethiol.

Preferred amines B are difunctional or polyfunctional aliphatic amines which, in addition to one or more primary amino groups, carry a secondary amino group, in particular N-methyl-1,2-ethanediamine, N-ethyl-1,2-ethanediamine, N-cyclohexyl-1,2-ethanediamine, N-methyl-1,3-propanediamine, N-ethyl-1,3-propane-diamine, N-butyl-1,3-propanediamine, N-cyclohexyl-1,3-propanediamine, 4-aminomethylpiperidine, 3-(4-aminobutyl)piperidine, DETA, DPTA, BHMT and fatty diamines, such as N-cocoalkyl-1,3-propanediamine, N-oleyl-1,3-propanediamine, N-soyaalkyl-1,3-propane-diamine and N-tallowalkyl-1,3-propanediamine. Aliphatic hydroxy- and mercaptoamines in which the primary amino group are separated from the hydroxyl or the mercapto group by a chain of at least 5 atoms, or by a ring, are also preferred, in particular 5-amino-1-pentanol, 6-amino-1-hexanol and higher homologues thereof, 4-(2-aminoethyl)-2-hydroxyethylbenzene, 3-aminomethyl-3,5,5-trimethylcyclohexanol, 2-(2-aminoethoxy)ethanol, triethylene glycol monoamine and higher oligo- and polymers thereof, 3-(2-hydroxyethoxy)propylamine, 3-(2-(2-hydroxyethoxy)ethoxy)propylamine and 3-(6-hydroxy-hexyloxy)propylamine.

The reaction between an aldehyde A and an amine B leads to hydroxyaldimines if a hydroxyamine is used as amine B; to mercaptoaldimines if a mercaptoamine is used as amine B; to aminoaldimines if a difunctional or polyfunctional amine which, in addition to one or more primary amino groups, carries one or more secondary amino groups is used as amine B; or to ureaaldimines if a trisubstituted urea which carries one or more primary amino groups is used as amine B.

In one embodiment, the aldimines of the formula (XI) have a substituent N—R$^8$ as substituent X. Such aldimines of the formula (XI) can be prepared by reacting at least one sterically hindered aliphatic aldehyde A of the formula (IV) with at least one difunctional or polyfunctional aliphatic primary amine C of the formula [H$_2$N]$_m$—R$^4$—NH$_2$ in a first step to give an intermediate of the formula (VII) which, in addition to one or more aldimino groups, also contains a primary amino group, and then reacting this intermediate in a second step in an addition reaction with a Michael acceptor of the formula (VIII) in a ratio of number of double bonds:number of NH$_2$ groups=1:1. This results in the formation of an aminoaldimine which, in addition to one or more aldimino groups, also contains at least one, preferably exactly one, secondary amino group.

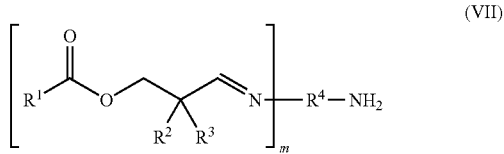

(VII)

In the formula (VII), m, R$^1$, R$^2$, R$^3$ and R$^4$ have the same meaning as described for formula (I).

(VIII)

(IX)

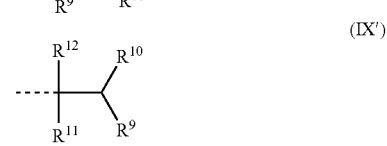

(IX')

Thus, aldimines of the formula (XI) in which X is the radical N—R$^8$ and R$^8$ is a monovalent hydrocarbon radical of the formula (IX) or (IX') form. In the formulae (VIII), (IX) and (IX'), R$^9$ is a radical which is selected from the group consisting of —COOR$^{13}$, —CN, —NO$_2$, —PO(OR$^{13}$)$_2$, —SO$_2$R$^{13}$ and —SO$_2$OR$^{13}$ and R$^{10}$ is a hydrogen atom or a radical from the group consisting of —R$^{13}$, —COOR$^{13}$ and R$^{11}$ and R$^{12}$, independently of one another, are a hydrogen atom or a radical from the group consisting of —R$^{13}$, —COOR$^{13}$ and —CN, R$^{13}$ being a monovalent hydrocarbon radical having 1 to 20 C atoms.

The amine C is an aliphatic amine having at least two primary amino groups.

Examples of suitable amines C are aliphatic polyamines, such as ethylenediamine, 1,2- and 1,3-propanediamine, 2-methyl-1,2-propanediamine, 2,2-dimethyl-1,3-propanediamine, 1,3- and 1,4-butanediamine, 1,3- and 1,5-pentanediamine, 2-butyl-2-ethyl-1,5-pentanediamine, 1,6-hexamethylenediamine (HMDA), 2,2,4- and 2,4,4-trimethylhexamethylenediamine and mixtures thereof (TMD), 1,7-heptanediamine, 1,8-octanediamine, 2,4-dimethyl-1,8-octanediamine, 4-aminomethyl-1,8-octanediamine, 1,9-nonanediamine, 2-methyl-1,9-nonanediamine, 5-methyl-1,9-nonanediamine, 1,10-decanediamine, iso-decanediamine, 1,11-undecanediamine, 1,12-dodecane-diamine, methylbis(3-aminopropyl)amine, 1,5-diamino-2-methylpentane (MPMD), 1,3-diaminopentane (DAMP), 2,5-dimethyl-1,6-hexamethylenediamine; cycloaliphatic polyamines, such as 1,2-, 1,3- and 1,4-diamino-cyclohexane, bis(4-aminocyclohexyl)methane (H$_{12}$MDA), bis(4-amino-3-methylcyclohexyl)methane, bis(4-amino-3-ethylcyclohexyl)methane, bis(4-amino-3,5-dimethyl-cyclohexyl)methane, bis(4-amino-3-ethyl-5-methylcyclo-hexyl)methane (M-MECA), 1-amino- 3-aminomethyl-3,5,5-trimethylcyclohexane (=isophoronediamine or IPDA), 2- and 4-methyl-1,3-diaminocyclohexane and mixtures thereof, 1,3- and 1,4-bis(aminomethyl)-cyclohexane, 1,3,5-tris(aminomethyl)cyclohexane, 1-cyclohexylamino-3-aminopropane, 2,5(2,6)-bis(amino-methyl)bicyclo[2.2.1]heptane (NBDA, produced by Mitsui Chemicals), 3(4),8(9)-bis(aminomethyl)tricyclo-[5.2.1.0$^{2,6}$]decane, 1,4-diamino-2,2,6-trimethylcyclo-hexane (TMCDA), 3,9-bis(3-aminopropyl)-2,4,8,10-tetra-oxaspiro[5.5]undecane; arylaliphatic polyamines, such as 1,3-xylylenediamine (MXDA), 1,4-xylylenediamine (PXDA), 1,3,5-tris(aminomethyl)benzene, aliphatic poly-amines containing ether groups, such as bis(2-aminoethyl)ether, 4,7-dioxadecane-1,10-diamine, 4,9-dioxadodecane-1,12-diamine and higher oligomers thereof; polyoxyalkylenepolyamines having theoretically two or three amino groups, obtainable, for example, under the name Jeffamine® (produced by Huntsman Chemicals). Di- or triamines in which the primary amino groups are separated by a chain of at least 5 atoms, or by a ring, are preferred, in particular 1,5-diamino-2-methylpentane, 1,6-hexamethylenediamine, 2,2,4- and 2,4,4-trimethylhexamethylenediamine and mixtures thereof, 1,10-decanediamine, 1,12-dodecanediamine, 1,3- and 1,4-diaminocyclohexane, bis(4-aminocyclohexyl)-methane, bis(4-amino-3-methylcyclohexyl)methane, 1-amino-3-aminomethyl-3,5,5-trimethylcyclohexane, 1,3- and 1,4-bis(aminomethyl)cyclohexane, 2,5(2,6)-bis-(aminomethyl)bicyclo[2.2.1]heptane, 3(4),8(9)-bis-(aminomethyl)tricyclo[5.2.1.0$^{2,6}$]decane, 1,4-diamino-2,2,6-trimethylcyclohexane (TMCDA), 3,9-bis(3-amino-propyl)-2,4,8,10-tetraoxaspiro[5.5]undecane, 1,3- and 1,4-xylylenediamine, 1,3,5-tris(aminomethyl) benzene and polyoxyalkylenepolyamines having theoretically two or three amino groups, obtainable, for example, under the name Jeffamine® (produced by Huntsman Chemicals).

Examples of suitable Michael acceptors of the formula (VIII) are diesters of maleic or fumaric acid, such as dimethyl maleate, diethyl maleate, dibutyl maleate, diethyl fumarate; diesters of citraconic acid, such as dimethyl citraconate; esters of acrylic or methacrylic acid, such as methyl (meth)acrylate, ethyl (meth)-acrylate, butyl (meth)acrylate, lauryl (meth)acrylate, stearyl (meth)acrylate, tetrahydrofuryl (meth)acrylate, isobornyl (meth)acrylate; diesters of itaconic acid, such as dimethyl itaconate; cinnamic acid esters, such as methyl cinnamate; diesters of vinylphosphonic acid, such as dimethyl vinylphosphonate; vinylsulfonic acid esters, in particular aryl vinylsulfonates; vinyl sulfones; vinylnitriles, such as acrylonitrile, 2-pentenenitrile or fumaronitrile; 1-nitroethylenes, such as β-nitrostyrene; and Knoevenagel condensates, such as, for example, those obtained from diesters of malonic acid and aldehydes, such as formaldehyde, acetaldehyde or benzaldehyde. Diesters of maleic acid, acrylic acid esters, diesters of phosphonic acid and vinylnitriles are preferred.

The reaction of the aldehyde A with the amine C to give the intermediate of the formula (VII) is effected in a condensation reaction with elimination of water, as described further above for the reaction of the aldehyde A with the amine B. The stoichiometry between the aldehyde A and the amine C is chosen so that m mol of aldehyde A are used for 1 mol of amine C which contains m+1 mol of primary amino groups. A solvent-free preparation process is preferred, the water formed in the condensation being removed from the reaction mixture by application of a vacuum.

The reaction of the intermediate of the formula (VII) with the Michael acceptor of the formula (VIII) is effected, for example, by mixing the intermediate with a stoichiometric or slightly superstoichiometric amount of the Michael acceptor of the formula (VIII) and heating the mixture at temperatures of from 20 to 110° C. until complete conversion of the intermediate into the aldimine of the formula (XI). The reaction is preferably effected without use of solvents.

The aldimines of the formula (XI) can, if appropriate, be in equilibrium with cyclic forms, as shown by way of example in formula (X). These cyclic forms are cyclic aminals, for example imidazolidines or tetrahydro-pyrimidines, in the case of aminoaldimines; cyclic aminoacetals, for example oxazolidines or tetrahydro-oxazines, in the case of hydroxyaldimines; cyclic thio-aminals, for example thiazolidines or tetrahydro-thiazines, in the case of mercaptoaldimines.

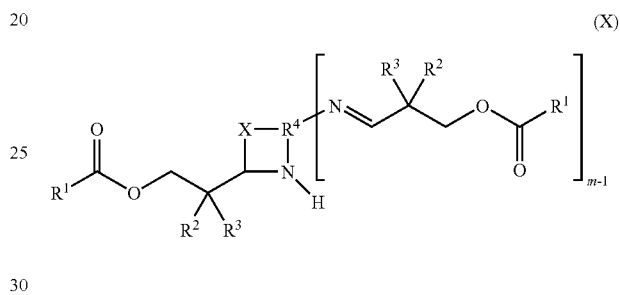

In the formula (X), m, R$^1$, R$^2$, R$^{34}$, R$^4$ and X have the same meaning as described for formula (I).

Surprisingly, most aldimines of the formula (XI) do not tend to undergo cyclization. Particularly for aminoaldimines, it is possible to show by means of IR and NMR spectroscopy methods that these compounds are present predominantly in the open-chain form, i.e. the aldimine form, whereas the cyclic form, i.e. the aminal form, does not occur or occurs only in traces. This is contrary to the behavior of the aminoaldimines according to the prior art, as described, for example, in U.S. Pat. No. 4,404,379 and U.S. Pat. No. 6,136,942: these are in fact present mainly in the cycloaminal form. Hydroxy- and mercaptoamines in which the primary amino group are separated from the hydroxyl or the mercapto group by a chain of at least 5 atoms, or by a ring, also show scarcely any cyclization. The substantial absence of cyclic structures in the aldimines of the formula (XI) is to be regarded as an advantage, particularly with regard to the use thereof in isocyanate-containing compositions, since the aldimines are thereby substantially free of the basic nitrogen atoms occurring in the aminals, oxazolidines and thioaminals, which nitrogen atoms could reduce the shelf-life of the isocyanate-containing composition.

The aldimines of the formula (XI) are odorless. They have a long shelf-life under suitable conditions, in particular in the absence of moisture. On admission of moisture, the aldimino groups of the aldimines may hydrolyze via intermediates formally to amino groups, the corresponding aldehyde A used for the preparation of the aldimine being liberated. Since this hydrolysis reaction is reversible and the chemical equilibrium is substantially on the aldimine side, it is to be assumed that, in the absence of groups reactive toward amines, only some of the aldimino groups undergo partial or complete hydrolysis.

Di- or polyfunctional, mono- and/or oligomeric aliphatic, cycloaliphatic, arylaliphatic and aromatic polyisocyanates of the formula (XII)

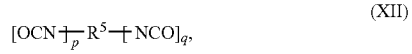

$$[OCN]_p R^5 [NCO]_q, \quad (XII)$$

are suitable as polyisocyanate D, such as, for example, 1,6-hexamethylene diisocyanate (HDI), 2-methylpenta-methylene 1,5-diisocyanate, 2,2,4- and 2,4,4-trimethyl-1,6-hexamethylene diisocyanate (TMDI), 1,12-dodeca-methylene diisocyanate, lysine and lysine ester diisocyanate, cyclohexane 1,3- and 1,4-diisocyanate and any desired mixtures of these isomers, 1-isocyanato-3,3,5-trimethyl-5-isocyanatomethylcyclohexane (=iso-phorone diisocyanate or IPDI), perhydro-2,4'- and 4,4'-diphenylmethane diisocyanate (HMDI), 1,4-diiso-cyanato-2,2,6-trimethylcyclohexane (TMCDI), 1,3- and 1,4-bis(isocyanatomethyl)cyclohexane, m- and p-xylylene diisocyanate (m- and p-XDI), 1,3,5-tris(isocyanato-methyl)benzene, m- and p-tetramethyl-1,3- and 1,4-xylylene diisocyanate (m- and p-TMXDI), bis(1-iso-cyanato-1-methylethyl)naphthalene, α, α, α', α', α'', α''-hexamethyl-1,3,5-mesitylene triisocyanate, dimeric and trimeric fatty acid isocyanates, such as 3,6-bis(9-isocyanatononyl)-4,5-di(1-heptenyl)cyclo-hexene (dimeryl diisocyanate), 2,4- and 2,6-toluylene diisocyanate and any desired mixtures of these isomers (TDI), 4,4'-, 2,4'- and 2,2'-diphenylmethane diiso-cyanate and any desired mixtures of these isomers (MDI), mixtures of MDI and MDI homologues (polymeric MDI or PMDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TOBI), tri(4-isocyanato-phenyl)methane, tris(4-isocyanatophenyl) thiophosphate; oligomers of these isocyanates containing uretdione, isocyanurate or iminooxadiazinedione groups; modified di- and polyfunctional isocyanates containing ester, urea, urethane, biuret, allophanate, carbodiimide, uretonimine or oxadiazinetrione groups; and isocyanate-containing polyurethane polymers, i.e. reaction products of polyisocyanates with substances having two or more hydroxyl groups (so-called "polyols"), which reaction products have more than one isocyanate group, such as, for example, dihydric or polyhydric alcohols, glycols or aminoalcohols, polyhydroxyfunctional poly-ethers, polyesters, polyacrylates, polycarbonates or polyhydrocarbons, in particular polyethers.

The reaction between the aldimine of the formula (XI) and the polyisocyanate D to give the adduct of the formula (I) is effected under known conditions, as are typically used for reactions between the reactive groups participating in the respective reaction, for example at from 20 to 100° C. The reaction is effected with the use of a solvent or preferably in the absence of a solvent. If appropriate, auxiliaries, such as, for example, catalysts, initiators or stabilizers, may be concomitantly used. The reaction is preferably carried out at room temperature and without a catalyst for aminoaldimines, at from 40 to 100° C. and with the use of a catalyst as used for the urethanization reaction between isocyanates and alcohols, for example an organotin compound, a bismuth complex, a tertiary amine compound or a combination of such catalysts, for hydroxy-, mercapto- and ureaaldimines.

If the addition reaction between the aldimine of the formula (XI) and the polyisocyanate D to give an aldimine-containing compound of the formula (I) is carried out stoichiometrically, i.e. with one mole equivalent of active hydrogen of the aldimine per one mole equivalent of isocyanate groups of the polyisocyanate D—with the result that the reactive groups thereof are completely reacted—a polyaldimine is obtained as an adduct of the formula (I). Thus, diverse polyaldimines are obtained in a simple manner without it being necessary to rely for their preparation on the corresponding primary polyamines which are technically and commercially available only to a limited extent. Depending on structure, functionality and molecular weight of the polyisocyanate D and of the aldimines of the formula (XI), these polyaldimines may have very different properties; they can therefore be tailored to the needs of a certain application.

If the addition reaction between the aldimine of the formula (XI) and the polyisocyanate D is carried out, on the other hand, substoichiometrically, i.e. with less than one mole equivalent of active hydrogen of the aldimine per one mole equivalent of isocyanate groups of the polyisocyanate—with the result that only some of the isocyanate groups are reacted—a hetero-functional compound is obtained as an adduct, i.e. a compound of the formula (I) which, in addition to one or more aldimino groups, also has one or more isocyanate groups. This is evident from the fact that the value for the index q is >0.

The adducts of aldimines of the formula (XI) with polyisocyanates D, i.e. the aldimine-containing compounds of the formula (I), obtained in the manner described, are odorless, like the aldimines of the formula (XI). They have a long shelf-life under suitable conditions, in particular in the absence of moisture.

The aldimines of the formula (XI) and the aldimine-containing compounds of the formula (I) can be very widely used. In principle, they can be used wherever they can serve as a source of the aldehydes of the formula (IV) and/or of the amines B. In particular, they can be used in the function of protected amines or protected aldehydes, in aldehyde- and/or amine-reactive systems, and, if required, can be deprotected there in a targeted manner. In particular, they are used in systems in which compounds which react with primary amines are present. The deprotection is effected hydrolytically, for example by contact with water or moisture, in particular atmospheric humidity.

On admission of moisture, the aldimino groups of the adducts of the formula (I) can hydrolyze via intermediates formally to amino groups, the corresponding aldehyde A used for the preparation of the aldimine of the formula (XI) being liberated. Since this hydrolysis reaction is reversible and the chemical equilibrium is substantially on the aldimine side, it is to be assumed that, in the absence of groups reactive toward amines, only some of the aldimino groups undergo partial or complete hydrolysis. The reaction of the isocyanate groups with the hydrolyzing aldimino groups need not necessarily take place via amino groups. Of course, reactions with intermediates of the hydrolysis reaction are also possible. For example, it is conceivable that the hydrolyzing aldimino group reacts in the form of a hemiaminal directly with the isocyanate groups.

The composition furthermore contains an isocyanate-containing polyurethane polymer P. Here and in the entire present document, the term "polymer" comprises both a group of macromolecules which are chemically uniform but differ with respect to degree of polymerization, molar mass and chain length and which were prepared by a polyreaction, as well as derivatives of such a group of macromolecules from polyreactions, i.e. compounds which were obtained by reactions, such as, for example, additions or substitutions, of functional groups on specified macromolecules and which may be chemically uniform or chemically nonuniform. The term "polyurethane polymer" comprises all polymers which are prepared by the diisocyanate polyaddition process. This also includes those polymers which are virtually free or completely free from urethane groups, such as polyether polyurethanes, polyester poly-urethanes, polyether polyureas, polyureas, polyester polyureas, polyisocyanurates, polycarbodiimides, etc.

In the present document, the term "plastic precursor" designates monomeric, oligomeric or polymeric organic compounds—or homogeneous or heterogeneous compositions containing such compounds to a substantial extent—which, owing to reactive groups present in them and accessible for polyreactions, are capable of reacting with themselves or together with other molecules to give high molecular weight plastics, i.e. organic polymers, a process which is commonly referred to as "curing" or as "crosslinking"—regardless of whether the reactions taking place during the curing lead to structures which are crosslinked covalently or otherwise. The term "polyreactions" comprises all types of polyaddition, polycondensation and polymerization reactions.

The polyurethane polymer P is prepared by reacting at least one polyol with at least one polyisocyanate. This reaction can be effected by reacting the polyol and the polyisocyanate by customary processes, for example at temperatures of from 50° C. to 100° C., if appropriate with the concomitant use of suitable catalysts, the polyiso-cyanate being metered so that its isocyanate groups are present in stoichiometric excess relative to the hydroxyl groups of the polyol. The excess of polyiso-cyanate is chosen so that, for example, a content of free isocyanate groups of 0.1-15% by weight, in particular 0.5-5% by weight, based on the total polyurethane polymer P, remains in the resulting polyurethane polymer P after the reaction of all hydroxyl groups of the polyol. If appropriate, the polyurethane polymer P can be prepared with the concomitant use of plasticizers, the plasticizers used containing no groups reactive toward isocyanates.

For example, the following, commercially available polyols, or any desired mixtures thereof, can be used as polyols for the preparation of such an isocyanate-containing polyurethane polymer P:

polyoxyalkylene polyols, also referred to as polyether polyols or oligoetherols, which are polymerization products of ethylene oxide, 1,2-propylene oxide, 1,2- or 2,3-butylene oxide, tetra-hydrofuran or mixtures thereof, possibly polymerized with the aid of an initiator having two or more active hydrogen atoms per molecule, such as, for example, water, ammonia or compounds having a plurality of OH or NH groups, such as, for example, 1,2-ethanediol, 1,2- and 1,3-propanediol, neopentyl glycol, diethylene glycol, triethylene glycol, the isomeric dipropylene glycols and tripropylene glycols, the isomeric butane-diols, pentanediols, hexanediols, heptanediols, octane-diols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the abovementioned compounds. Both polyoxy-alkylene polyols which have a low degree of unsaturation (measured according to ASTM D-2849-69 and stated in milliequivalent of unsaturation per gram of polyol (mEq/g)), prepared, for example, with the aid of so-called double metal cyanide complex catalysts (DMC catalysts), and polyoxyalkylene polyols having a higher degree of unsaturation, prepared, for example, with the aid of anionic catalysts, such as NaOH, KOH, CsOH or alkali metal alcoholates, may be used.

Polyoxyalkylenediols or polyoxyalkylenetriols, in particular polyoxypropylenediols or polyoxypropylene-triols, are particularly suitable. Polyoxyalkylenediols or polyoxyalkylenetriols having a degree of unsaturation of less than 0.02 mEq/g and having a molecular weight in the range of 1000-30 000 g$\mu$mol, and polyoxypropylenediols and -triols having a molecular weight of 400-8000 g/mol are especially suitable. In the present document, the term "molecular weight" designates the average molecular weight $M_n$.

Likewise particularly suitable are so-called ethylene oxide-terminated ("EO-endcapped", ethylene oxide-endcapped) polyoxypropylene polyols. The latter are special polyoxypropylene polyoxyethylene polyols, which are obtained, for example, if pure polyoxypropylene polyols, in particular polyoxypropylenediols and -triols, are further alkoxylated with ethylene oxide after the end of the polypropoxylation reaction and thereby have primary hydroxyl groups.

Styrene-acrylonitrile- or acrylonitrile-methyl meth-acrylate-grafted polyether polyols.

Polyester polyols, also referred to as oligoesterols, prepared, for example, from di- to trihydric alcohols, such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the abovementioned alcohols, with organic dicarboxylic acids or their anhydrides or esters, such as, for example, succinic acid, glutaric acid, adipic acid, suberic acid, sebacic acid, dodecanedicarboxylic acid, maleic acid, fumaric acid, phthalic acid, isophthalic acid, terephthalic acid and hexahydro-phthalic acid or mixtures of the abovementioned acids, and polyester polyols obtained from lactones, such as, for example, $\epsilon$-caprolactone.

Polycarbonate polyols as are obtainable by reaction, for example, of the abovementioned alcohols—used for the synthesis of the polyester polyols—with dialkyl carbonates, diaryl carbonates or phosgene.

Polyacrylate- and polymethacrylate polyols.

Polyhydrocarbon polyols, also referred to as oligo-hydrocarbonols, such as, for example, polyhydroxy-functional ethylene-propylene, ethylene-butylene or ethylene-propylene-diene copolymers, as produced, for example, by Kraton Polymers, or polyhydroxyfunctional copolymers obtained from dienes, such as 1,3-butane-diene or diene mixtures, and vinyl monomers, such as styrene, acrylonitrile or isobutylene, or polyhydroxy-functional polybutadiene polyols, such as, for example, those which are prepared by copolymerization of 1,3-butadiene and allyl alcohol.

Polyhydroxyfunctional acrylonitrile/polybutadiene copolymers, as can be prepared, for example, from epoxides or amino alcohols and carboxyl-terminated acrylonitrile/polybutadiene copolymers (commercially available under the name Hycar® CTBN from Hanse Chemie).

These stated polyols have an average molecular weight of 250-30 000 g/mol, in particular of 1000-30 000 g/mol, and an average OH functionality in the range from 1.6 to 3.

In addition to these stated polyols, small amounts of low molecular weight dihydric or polyhydric alcohols, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars, such as sucrose, other higher-hydric alcohols, low molecular weight alkoxylation products of the abovementioned dihydric and polyhydric alcohols, and mixtures of the abovementioned alcohols, can be concomitantly used in the preparation of the polyurethane polymer P.

Mono- or oligomeric di- or polyfunctional isocyanates, as were mentioned as being suitable as polyiso-cyanates D for the preparation of the aldimine-containing compound of the formula (I) are used as polyisocyanates for the preparation of such an isocyanate-containing polyurethane polymer. MDI, HDI, TDI and IPDI are particularly suitable as polyisocyanates.

The aldimine-containing compound of the formula (I) present in the composition—as already described above—can be prepared separately and incorporated as such into the composition. However, it can also be prepared in situ, i.e. in the course of the preparation of the composition, by reacting suitable amounts of at least one aldimine of the formula (XI) and at least one polyisocyanate D in situ, i.e. in the presence of further constituents of the composition. The polyisocyanate D is preferably an isocyanate-containing polyurethane polymer P, as was described in detail above.

Typically, the aldimine-containing compound of the formula (I) is present in an amount of from 0.1 to 30% by weight, preferably from 0.5 to 20% by weight and in particular from 1 to 10% by weight, based on the composition.

If the aldimine-containing compound of the formula (I) is heterofunctional, its content may also be more than 30% by weight. This content may then also be toward 100% by weight, since such a composition crosslinks under the influence of water. This is the case if m, q and p in formula (I) are chosen so that $m \cdot p \leq q$.

It is advantageous if the composition contains at least one catalyst CAT-1 in addition to the aldimine-containing compound of the formula (I) and to the polyurethane polymer P. Compounds which have a long shelf-life together with isocyanate groups and which accelerate the reactions of the isocyanate groups, in particular those with aldimino groups and with moisture, leading to curing of the composition are suitable as catalyst CAT-1. Acids, for example organic carboxylic acids, such as benzoic acid, salicylic acid or 2-nitrobenzoic acid, organic carboxylic anhydrides, such as phthalic anhydride or hexahydrophthalic anhydride, silyl esters of organic carboxylic acids, organic sulfonic acids, such as methanesulfonic acid, p-toluenesulfonic acid or 4-dodecylbenzenesulfonic acid, or further organic or inorganic acids; metal compounds, for example tin compounds, for example dialkyltin dicarboxylates, such as dibutyltin diacetate, dibutyltin bis(2-ethylhexanoate), dibutyltin dilaurate, dibutyltin dipalmitate, dibutyltin distearate, dibutyltin dioleate, dibutyltin dilinoleate, dibutyltin dilinolenate, dibutyltin diacetylacetonate, dibutyltin maleate, dibutyltin bis-(octylmaleate), dibutyltin phthalate, dimethyltin dilaurate, dioctyltin diacetate or dioctyltin dilaurate, dialkyltin mercaptides, such as dibutyltin bis(2-ethylhexylmercaptoacetate) or dioctyltin bis-(2-ethylhexylmercaptoacetate), dibutyltin dichloride, monobutyltin trichloride, alkyltin thioester, dibutyl-tin oxide, dioctyltin oxide, tin(II) carboxylates, such as tin(II) octanoate, tin(II) 2-ethylhexanoate, tin(II) laurate, tin(II) oleate or tin(II) naphthenate, stannoxanes, such as lauryl stannoxane, bismuth compounds, such as bismuth(III) octanoate, bismuth(III) neodecanoate or bismuth(III) oxinates; weakly basic tertiary amine compounds, such as, for example, 2,2'-dimorpholinodiethyl ether and other morpholine ether derivatives; and combinations of said compounds, in particular of acids and metal compounds or of metal compounds and compounds containing amino groups, should be mentioned as suitable catalysts CAT-1.

The composition optionally contains further constituents, as are usually used according to the prior art. In particular, the composition optionally contains one or more of the following auxiliaries and additives:

plasticizers, for example esters of organic carboxylic acids or the anhydrides thereof, phthalates, such as, for example, dioctyl phthalate or diisodecyl phthalate, adipates, such as, for example, dioctyl adipate, sebacates, polyols, such as, for example, polyoxyalkylene polyols or polyester polyols, organic phosphoric and sulfonic acid esters or polybutenes;

solvents, for example ketones, such as acetone, methyl ethyl ketone, diisobutyl ketone, acetonyl-acetone, mesityl oxide, and cyclic ketones, such as methylcyclohexanone and cyclohexanone; esters, such as ethyl acetate, propyl acetate or butyl acetate, formates, propionates or malonates; ethers, such as ketone ethers, ester ethers and dialkyl ethers, such as diisopropyl ether, diethyl ether, dibutyl ether, diethylene glycol diethyl ether and ethylene glycol diethyl ether; aliphatic and aromatic hydrocarbons, such as toluene, xylene, heptane, octane and different mineral oil fractions, such as naphtha, white spirit, petroleum ether or gasoline; halogenated hydrocarbons, such as methylene chloride; and N-alkylated lactams, such as, for example, N-methylpyrrolidone, N-cyclo-hexylpyrrolidone or N-dodecylpyrrolidone;

inorganic or organic fillers, such as, for example, milled or precipitated calcium carbonates, which are optionally coated with stearates, in particular finely divided coated calcium carbonate, carbon blacks, kaolins, aluminas, silicas, PVC powders or hollow spheres; fibers, for example of polyethylene; pigments;

further catalysts customary in polyurethane chemistry;

reactive diluents and crosslinking agents, for example polyisocyanates, such as MDI, PMDI, TDI, HDI, 1,12-dodecamethylene diisocyanate, cyclohexane 1,3- or 1,4-diisocyanate, IPDI, perhydro-2,4'- and 4,4'-diphenylmethane diisocyanate, 1,3- and 1,4-tetramethylxylylene diisocyanate, oligomers and polymers of these polyisocyanates, in particular isocyanurates, carbodiimides, uretonimines, biurets, allophanates and iminooxadiazinediones of said polyisocyanates, adducts of polyisocyanates with short-chain polyols, and adipic acid dihydrazide and other dihydrazides;

latent polyamines, such as, for example, poly-aldimines, polyketimines, polyenamines, poly-oxazolidines, polyamines adsorbed on a zeolite or microencapsulated polyamines and amine-metal complexes, preferably polyaldimines from the reaction of a primary aliphatic polyamine with an aldehyde, in particular an aldehyde A, such as, for example, 2,2-dimethyl-3-acyloxypropanal, in particular 2,2-dimethyl-3-lauroyloxypropanal, and complexes between methylenedianiline (MDA) and sodium chloride (obtainable as a dispersion in diethylhexyl phthalate or diisodecyl phthalate under the trade name Caytur® 21 from Crompton Chemical);

drying agents, such as, for example, p-tosyl isocyanate and other reactive isocyanates, orthoformic acid esters, calcium oxide; vinyltrimethoxysilane or other rapidly hydrolyzing silanes, such as, for example, organoalkoxysilanes which have a functional group in the α-position relative to the silane group, or molecular sieves;

rheology modifiers, such as, for example, thickeners, for example urea compounds, polyamide waxes, bentonites or pyrogenic silicas;

adhesion promoters, in particular silanes, such as, for example, epoxysilanes, vinylsilanes, (meth)-acryloylsilanes, isocyanatosilanes, carbamatosilanes, S-(alkylcarbonyl)mercaptosilanes and aldiminosilanes, and oligomeric forms of these silanes;

heat, light and UV stabilizers; flame-retardant substances;

surface-active substances, such as, for example, wetting agents, leveling agents, deaerating agents or antifoams;

biocides, such as, for example, algicides, fungicides or substances which inhibit fungal growth;

and further substances usually used in isocyanate-containing compositions.

Furthermore, the composition may contain polymers which have hydrolyzable organoalkoxysilane groups, which are referred to below as "silane groups". The following may be mentioned by way of example for such polymers containing silane groups: reaction products of isocyanate-containing polyurethane polymers with organoalkoxysilanes reactive toward isocyanates, such as, for example, mercaptoalkylalkoxysilanes or amino-alkylalkoxysilanes, described, for example, in U.S. Pat. No. 3,632,557, in particular the reaction products of isocyanate-containing polyurethane polymers with Michael adducts of aminoalkylsilanes and maleic or fumaric acid diesters, described, for example, in EP 0 403 921 B1; products of hydrolysis reactions of polymers having terminal double bonds, in particular of allyl-terminated polyoxyalkylene polymers, with alkoxy-silanes, described, for example, in U.S. Pat. No. 3,971,751 and U.S. Pat. No. 6,207,766; reaction products of polymers containing active hydrogen atoms, for example in the form of hydroxyl or mercapto groups, with isocyanatoalkyl-silanes, described, for example, in U.S. Pat. No. 4,345,053 and U.S. Pat. No. 5,990,257; polymers containing 3-(N-silylalkyl)-aminopropenoate groups, which are reaction products of polymers containing 3-oxopropanoate groups and amino-alkylsilanes, described, for example, in WO 2004/056905 A1. The composition may also contain polymers which have both isocyanate groups and silane groups.

The molar ratio between aldimino groups and isocyanate groups in the composition is preferably 0.1-1.1, preferably 0.25-1.0, particularly preferably 0.5-1.0.

The composition is prepared and stored in the absence of moisture. In a suitable, climatically sealed packaging or arrangement, such as, for example, in a drum, a bag or a cartridge, it has an outstanding shelf-life. In the present document, the terms "has a long shelf-life" and "shelf-life" in relation to a composition designate the fact that the viscosity of the composition on suitable storage does not increase in the time span considered or increases at most to such an extent that the composition remains usable in the intended manner.

The composition described is suitable as a plastic precursor.

If the composition is brought into contact with moisture, it begins to cure to give a high molecular weight polyurethane plastic. The composition is thus moisture-curing and is referred to as a one-component moisture-curing composition. The curing is based on a combination of different hydrolysis, addition and condensation reactions between the reactive groups present in the composition, namely aldimino groups and isocyanate groups and optionally present silane groups. The aldimino groups hydrolyze formally to amino groups and react with the isocyanate groups rapidly to give urea groups. Isocyanate groups react with one another to give urea groups, while silane groups react with one another to give siloxane groups. The reaction between hydrolyzing aldimino groups and isocyanate groups is faster than the reaction of the isocyanate groups with one another and takes place until the aldimino groups completely or virtually completely disappear. The hydrolyzing aldimino groups need not necessarily react in completely hydrolyzed form, as amino groups, with the isocyanate groups but can also react in partly hydrolyzed form, for example in the form of hemiaminal groups, with the isocyanate groups. In addition to the moisture, further factors, such as strong heating, for example to 80 to 200° C., or UV radiation, or a combination of these factors, can also contribute to the curing of the composition.

Provided that sufficient moisture is available, the composition cures rapidly and completely to give a substantially nontacky mass. The curing takes place without bubble formation since the isocyanate groups react partly or completely with the hydrolyzing aldimino groups and therefore only little $CO_2$ or no $CO_2$ at all forms. The curing is additionally accelerated by the presence of catalysts, for example the above-mentioned organic carboxylic acids or sulfonic acids, for the hydrolysis of the aldimino groups, without bubble formation taking place. The moisture required for curing may originate from the air (atmospheric humidity), the composition curing from the outside to the inside by the diffusion of moisture. The composition can, however, also be brought into contact with a water-containing component, for example by coating, for example with a smoothing agent, by spraying or by means of immersion methods, or a water-containing component can be added to the composition, for example in the form of a water-containing paste, which, for example, is mixed homogeneously or heterogeneously with the composition by means of a static mixer.

Because the aldimine-containing compounds of the formula (I) are odorless, the composition is odorless before, during and after curing. It can therefore also be used for applications requiring freedom from odor, such as, for example, for adhesive bonds, seals, coatings or coverings in the interior of vehicles or buildings.

The composition can be used as a plastic precursor for a very wide range of purposes. It is suitable in particular for use as an adhesive for the adhesive bonding of various substrates, for example for the adhesive bonding of components in the production of automobiles, railway vehicles, ships or other industrial goods, as sealant of all types, for example for sealing joints in construction, and as a coating or covering for various articles or variable substrates. Preferred coatings are protective paint coats, seals and protective coatings. Among the coverings, in particular floor coverings should be mentioned as being preferred. Such coverings are produced by pouring the composition typically onto the substrate and leveling it, where it cures to give a floor covering. For example, such floor coverings are used for offices, living areas, hospitals, schools, storage halls, multistory car parks and other private or industrial applications. Since many of these applications cover a large area, even the slight release of substances from the covering can lead to difficulties with respect to occupational hygiene and/or annoying odors, even in the case of an outdoor application. However, a major part of the floor coverings is applied in the interior area, and it is for this reason that particular importance is placed here on a low level of odor development. In a preferred embodiment, the compositions described are used as adhesive or as sealant.

In the application as adhesive, the composition is applied to a substrate S1 and/or a substrate S2. The adhesive can thus be applied to one or other substrate or to both substrates. Thereafter, the parts to be adhesively bonded are joined, whereupon the adhesive cures. Attention should be paid here to the fact that the joining of the parts takes place within the so-called open time in order to ensure that both parts to be joined are reliably adhesively bonded to one another.

In the application as sealant, the composition is applied between the substrates S1 and S2 and curing is then effected. Usually, the sealant is pressed into a joint.

In both applications, the substrate S1 may be identical to or different from substrate S2.

Suitable substrates S1 or S2 are, for example, inorganic substrates, such as, glass, glass ceramic, concrete, mortar, baked brick, brick, gypsum and natural stones, such as granite or marble; metals or alloys, such as aluminum, steel, nonferrous metals, galvanized metals; organic substrates, such as wood, plastics, such as PVC, polycarbonates, PMMA, polyesters, epoxy resins; coated substrates, such as powder-coated metals or alloys; and paints and finishes, in particular automotive finishes.

The substrates can, if required, be pretreated before application of the adhesive or sealant. Such pretreatments comprise in particular physical and/or chemical cleaning methods, for example grinding, sandblasting, brushing or the like, or treatment with cleaners or solvents or the application of an adhesion promoter, an adhesion promoter solution or a primer.

In the present document, "primer" is understood as meaning a composition which is suitable as an undercoat and which, in addition to unreactive volatile substances and optionally solid additives, contains at least one polymer and/or at least one substance having reactive groups and which is capable of curing to give a solid, readily adhering film in a layer thickness of typically 10-15 µm on application to a substrate, the curing taking place either solely by the evaporation of the unreactive volatile substances, such as, for example, a solvent or water, or by a chemical reaction, or by a combination of these factors, and which establishes good adhesion to a subsequently applied layer, for example an adhesive or sealant.

The application of the adhesive or sealant is preferably effected uniformly. The application of the composition can be effected in a broad temperature range. For example, the composition can be applied at room temperature, as is typical for a resilient adhesive or a sealant. However, the composition can also be applied at lower as well as at higher temperatures. The latter is particularly advantageous when the composition contains highly viscous or fusible components, as are typically present in melt adhesives, for example warm-melt adhesives or hot-melt adhesives. The application temperatures are, for example, in the range from 40 to 80° C. for warm-melts and from 80 to 200° C., in particular from 100 to 150° C., in the case of hot-melts.

After the adhesive bonding or sealing of the substrates S1 and S2 by means of the composition, an adhesively bonded or sealed article is obtained.

Such an article may be a structure, in particular a structure of building construction or civil engineering, or a means of transport, for example a water or land vehicle, in particular an automobile, a bus, a truck, a train or a ship, or an add-on part thereof.

Particularly if the composition is used as an adhesive for resilient adhesive bonds, it preferably has a pasty consistency with structural viscosity properties. Such an adhesive is applied by means of a suitable device to the substrate, preferably in the form of a bead, it being possible for this to have a substantially round or triangular cross-sectional area. Suitable methods for applying the adhesive are, for example, the application from commercially available cartridges, which are operated manually or by means of compressed air, or from a drum or hobbock by means of a delivery pump or an extruder, optionally by means of an application robot. An adhesive having good application properties has high stability and little stringiness. This means that it remains standing in the applied form after the application, i.e. does not flow apart, and, after the application device has been set down, forms no string or only a very short string so that the substrate is not soiled.

The composition has high green strength. For use in particular as an adhesive, this means that an adhesive bond can be loaded to a certain degree even before complete curing, which is a major advantage in industrial production, for example in the assembly of vehicles, as components attached by adhesive bonding are held in position by the adhesive bond after only a relatively short time and the adhesively bonded object can thus be moved and further processed without further fixing.

In the cured state, the composition is distinguished by excellent properties. It has, for example, high extensibility and a high tensile strength. Its modulus of elasticity varies as a function of the components used for the preparation of the composition, such as, for example, the polyols, polyisocyanates or polyamines, and can be adapted to the requirements of a certain application, for example to high values for adhesives or to low values for sealants. Its adhesion to various substrates is excellent, which, owing to the rapid curing, is certainly not self-evident since experience has shown that rapidly curing compositions often tend to weaknesses in the buildup of adhesion. Regarding the stability to ageing influences, such as, for example, heat, sunlight or UV radiation, moisture, vapor or the action of chemicals, there are no deviations from the behavior as is typical for isocyanate-containing polyurethane polymers in the cured state.

EXAMPLES

Description of the Methods of Measurement

The infrared spectra were measured on a 1600 FT-IR device from Perkin Elmer (horizontal ATR measuring unit with ZnSe crystal); the samples were applied undiluted as films. The absorption bands are stated in wave numbers ($cm^{-1}$) (measuring window: 4000-650 $cm^{-1}$)

$^1$H-NMR spectra were measured on a spectrometer of the type Bruker DPX-300 at 300.13 MHz; the chemical shifts δ are stated in ppm relative to tetramethylsilane (TMS) and coupling constants J are stated in Hz. The coupling patterns (t, m) were stated even if they are only pseudo-coupling patterns.

The viscosity was measured on a thermostatted Physica UM cone-and-plate viscometer (cone diameter 20 mm, cone angle 1°, cone apex to plate distance 0.05 mm, shear rate from 10 to 1000 $s^{-1}$).

The total content of aldimino groups and free amino groups in the compounds prepared ("amine content") was determined titrimetrically (using 0.1 N $HClO_4$ in glacial acetic acid, against crystal violet) and is always stated in mmol $NH_2$/g (even if they are not only primary amino groups).

Aldimines of the Formula (XI)

Aldimine AL1

40.64 g (0.143 mol) of 2,2-dimethyl-3-lauroyloxy-propanal were initially introduced under a nitrogen atmosphere in a round-bottomed flask. 11.68 g (0.133 mol) of N-methyl-1,3-propanediamine were added from a dropping funnel in the course of 5 minutes with vigorous stirring, the temperature of the reaction mixture increasing to 38° C. The volatile constituents were then removed in vacuo (10 mbar, 80° C.). 49.8 g of a colorless, clear and odorless liquid which had a low viscosity at room temperature and an amine content of 5.20 mmol $NH_2$/g were obtained. The product is present for the most part in the open-chain (aldimine) form.

IR: 3329(N—H), 2954sh, 2922, 2852, 789, 1736 (C=O), 1668 (C=N), 1466, 1419sh, 1392, 1374, 1348, 1300, 1249, 1234, 1160, 1112, 1069, 1058, 1021, 996, 938, 886, 876, 820, 722.

$^1$H-NMR (CDCl$_3$, 300K): δ 7.53 (s, 1H, CH=N), 4.01 (s, 2H, CH$_2$O), 3.44 (t, 2H, CH=NCH$_2$CH$_2$), 2.58 (t, 2H, NHCH$_2$), 2.42 (s, 3H, CH$_3$NH), 2.30 (t, 2H, CH$_2$CO), 1.76 (t, 2H, CH=NCH$_2$CH$_2$), 1.61 (m, 3H, CH$_2$CH$_2$CO and CH$_3$NHCH$_2$), 1.27 (m, 16H, CH$_3$—(CH$_2$)$_8$—CH$_2$CH$_2$CO), 1.10 (s, 6H, C(CH$_3$)$_2$—CH$_2$O), 0.89 (t, 3H, CH$_3$—(CH$_2$)$_{10}$—CO)

Aldimine AL2

30.13 g (0.106 mol) of 2,2-dimethyl-3-lauroyloxy-propanal were initially introduced under a nitrogen atmosphere in a round-bottomed flask. 15.00 g (0.096 mol) of N-cyclohexyl-1,3-propanediamine were added from a dropping funnel in the course of 5 minutes with vigorous stirring, the temperature of the reaction mixture increasing to 36° C. The volatile constituents were then removed in vacuo (10 mbar, 80° C.). 43.2 g of a colorless, clear and odorless liquid which had a low viscosity at room temperature and an amine content of 4.39 mmol $NH_2$/g were obtained. The product is present for the most part in the open-chain (aldimine) form.

IR: 3308 (N—H), 2921, 2851, 2659, 1737 (C=O), 1668 (C=N), 1465, 1449, 1418sh, 1393, 1366, 1346, 1301, 1248, 1158, 1111, 1068, 1020, 1002, 938, 888, 845, 797, 721.

$^1$H-NMR (CDCl$_3$, 300K): δ 7.53 (s, 1H, CH=N), 4.01 (s, 2H, CH$_2$O), 3.43 (t, 2H, CH=NCH$_2$CH$_2$), 2.65 (t, 2H, NHCH$_2$), 2.40 (s, 1H, Cy-C$^1$HNH), 2.29 (t, 2H, CH$_2$CO), 1.86 (m, 2H, 2 Cy-H), 1.72 (m, 4H, 2 Cy-H and CH=NCH$_2$CH$_2$), 1.60 (m, 3H, CH$_2$CH$_2$CO and CH$_3$NHCH$_2$), 1.26 (m, 22H, CH$_3$—(CH$_2$)$_8$—CH$_2$CH$_2$CO and 6 Cy-H), 1.09 (s, 6H, C(CH$_3$)$_2$—CH$_2$O), 0.88 (t, 3H, CH$_3$—(CH$_2$)$_{10}$—CO).

Aldimine AL3

69.31 g (0.244 mol) of 2,2-dimethyl-3-lauroyloxy-propanal were initially introduced under a nitrogen atmosphere in a round-bottomed flask. 14.72 g (0.112 mol) of dipropylenetriamine were added from a dropping funnel in the course of 5 minutes with vigorous stirring, the temperature of the reaction mixture increasing to 36° C. The volatile constituents were then removed in vacuo (10 mbar, 80° C.). 79.7 g of a colorless, clear and odorless liquid which had a low viscosity at room temperature and an amine content of 4.17 mmol $NH_2$/g were obtained. The product is present for the most part in the open-chain (aldimine) form.

IR: 3308 (N—H), 2952sh, 2921, 2851, 1737 (C=O), 1667 (C=N), 1466, 1418sh, 1393, 1373, 1348, 1301, 1248, 1234, 1159, 1111, 1070, 1019, 1001, 936, 875, 722.

$^1$H-NMR (CDCl$_3$, 300K): δ 7.53 (s, 2H, CH=N), 4.01 (s, 4H, CH$_2$O), 3.42 (t, 4H, CH=NCH$_2$CH$_2$), 2.61 (t, 4H, NHCH$_2$), 2.29 (t, 4H, CH$_2$CO), 1.73 (m, 4H, CH=NCH$_2$CH$_2$), 1.59 (m, 5H, CH$_2$CH$_2$CO and CH$_2$NHCH$_2$), 1.25 (m, 32H, CH$_3$—(CH$_2$)$_8$—CH$_2$CH$_2$CO), 1.09 (s, 12H, C(CH$_3$)$_2$—CH$_2$O), 0.87 (t, 6H, CH$_3$—(CH$_2$)$_{10}$—CO).

Aldimine AL4

34.15 g (0.120 mol) of 2,2-dimethyl-3-lauroyloxy-propanal were initially introduced under a nitrogen atmosphere in a round-bottomed flask. 12.02 g (0.056 mol) of bishexamethylenetriamine (BHMT-HP; Invista) were added from a dropping funnel in the course of 5 minutes with vigorous stirring, the temperature of the reaction mixture increasing to 35° C. The volatile constituents were then removed in vacuo (10 mbar, 80° C.). 43.6 g of a colorless, clear and odorless liquid which had a low viscosity at room temperature and an amine content of 3.68 mmol $NH_2$/g were obtained. The product is present for the most part in the open-chain (aldimine) form.

IR: 2922, 2851, 1737 (C=O), 1668 (C=N), 1465, 1417, 1393, 1373, 1340, 1248, 1234, 1159, 1111, 1020, 1003, 933, 870, 722.

$^1$H-NMR (CDCl$_3$, 300K): δ 7.52 (s, 2H, CH=N), 4.02 (s, 4H, CH$_2$O), 3.36 (t, 4H, CH=NCH$_2$CH$_2$), 2.59 (t, 4H, NHCH$_2$), 2.29 (t, 4H, CH$_2$CO), 1.76-1.51 (m, 13H, CH=NCH$_2$CH$_2$, NHCH$_2$CH$_2$, CH$_2$CH$_2$CO and CH$_2$NHCH$_2$), 1.27 (m, 40H, CH$_3$—(CH$_2$)$_8$—CH$_2$CH$_2$CO and NHCH$_2$CH$_2$CH$_2$), 1.10 (s, 12H, C(CH$_3$)$_2$—CH$_2$O), 0.88 (t, 6H, CH$_3$—(CH$_2$)$_{10}$—CO).

Aldimine AL5

30.28 g (0.106 mol) of 2,2-dimethyl-3-lauroyloxy-propanal were initially introduced under a nitrogen atmosphere in a round-bottomed flask. 5.00 g (0.049 mol) of diethylenetriamine were added from a dropping funnel in the course of 5 minutes with vigorous stirring. The volatile constituents were then removed in vacuo (10 mbar, 80° C.). 33.1 g of a colorless, clear and odorless liquid which had a low viscosity at room temperature and an amine content of 4.07 mmol $NH_2$/g were obtained. The product is present for the most part in the open-chain (aldimine) form.

IR: 3348 (N—H), 2952, 2921, 2852, 1735 (C=O), 1668 (C=N), 1632, 1465, 1417, 1393, 1373, 1345, 1248, 1232, 1158, 1110, 1056, 1022, 1005, 986, 931, 903, 875, 820, 721.

Aldimine AL6

20.97 g (0.074 mol) of 2,2-dimethyl-3-lauroyloxy-propanal were initially introduced under a nitrogen atmosphere in a round-bottomed flask. 10.00 g (0.067 mol) of triethylene glycol monoamine (Jeffamine® XTA-250; Huntsman) were added from a dropping funnel in the course of 5 minutes with vigorous stirring, the temperature of the reaction mixture increasing to 33° C. The volatile constituents were then removed in vacuo (10 mbar, 80° C.). 29.5 g of a colorless, clear and odorless liquid which had a low viscosity at room temperature and an amine content of 2.21 mmol $NH_2$/g were obtained. The product is present for the most part in the open-chain (aldimine) form.

IR: 3444br (O—H), 2952sh, 2921, 2852, 1736 (C=O), 1668 (C=N), 1466, 1418, 1394, 1374, 1366, 1350, 1301sh, 1248, 1145sh, 1116, 1067, 1023sh, 998sh, 932, 890, 829, 722.

$^1$H-NMR (CDCl$_3$, 300K): δ 7.59 (s, 1H, CH=N), 4.03 (s, 2H, CH$_2$O), 3.79-3.59 (m, 12H, HOCH$_2$CH$_2$OCH$_2$CH$_2$OCH$_2$CH$_2$N), 3.47 (s, 1H, HOCH$_2$), 2.31 (t, 2H, CH$_2$CO), 1.61 (m, 2H, CH$_2$CH$_2$CO), 1.27 (m, 16H, CH$_3$—(CH$_2$)$_8$—CH$_2$CH$_2$CO), 1.11 (s, 6H, C(CH$_3$)$_2$—CH$_2$O), 0.87 (t, 3H, CH$_3$—(CH$_2$)$_{10}$—CO)

Aldimine AL7

34.48 g (0.121 mol) of 2,2-dimethyl-3-lauroyloxy-propanal were initially introduced under a nitrogen atmosphere in a round-bottomed flask. 20.00 g (0.117 mol) of isophoronediamine (Vestamin® IPD, Degussa) were added from a dropping funnel in the course of 15 minutes with vigorous stirring. The volatile constituents were then removed in vacuo (10 mbar, 80° C.). 25.25 g (0.121 mol) of isobornyl acrylate (SR-506, Sartomer) were added at room temperature to the clear, colorless oil thus obtained. Stirring was effected for 30 minutes at room temperature, and the mixture was then heated to 85° C. and kept at this temperature for 24 hours. The volatile constituents were then removed in a high vacuum (100° C.). 72.0 g of a colorless, clear and odorless liquid which had a low viscosity at room temperature and an amine content of 3.09 mmol $NH_2$/g were obtained. The product is present for the most part in the open-chain (aldimine) form.

IR: 3322 (N—H), 2950, 2923, 2871, 2852, 1732 (C=O), 1668 (C=N), 1457, 1418sh, 1388sh, 1377, 1364, 1310, 1294, 1248, 1196, 1165, 1110, 1053, 1015, 987, 969, 942, 931sh, 914, 893, 863, 840, 796, 722.

Aldimine AL8 (Comparison)

48.18 g (0.243 mol) of 3-phenoxybenzaldehyde were initially introduced under a nitrogen atmosphere in a round-bottomed flask. 20.00 g (0.227 mol) of N-methyl-1,3-propanediamine were added from a dropping funnel in the course of 5 minutes with vigorous stirring, the temperature of the reaction mixture increasing to 40° C. The volatile constituents were then removed in vacuo (10 mbar, 80° C.). 63.7 g of a light yellow, clear and strongly smelling liquid which had a low viscosity at room temperature and an amine content of 7.08 mmol $NH_2$/g were obtained. The majority of the product is present in the cyclic (tetrahydropyrimidine) form.

IR: 3270 (N—H), 3060, 3036, 2978, 2940, 2837, 2773, 2692, 1935, 1865, 1778, 1702, 1645, 1582, 1483, 1456, 1442, 1418, 1370, 1353, 1308, 1236, 1210, 1188, 1163, 1128, 1108, 1072, 1053, 1023, 990, 964, 937, 917, 900, 889, 877, 839, 775, 748, 690.

$^1$H-NMR (CDCl$_3$, 300K): δ 7.42-7.28 (m, 5 Ar—H), 7.16-7.01 (m, 4 Ar—H), 3.74 (s, 1H, Ar—CH(NH)N), 3.14 (m, 2H, HNCH$^{eq}$H$^{ax}$ and CH$_3$NCH$^{eq}$H$^{ax}$), 2.78 (m, 1H, HNCH$^{eq}$H$^{ax}$), 2.35 (m, 1H, CH$_3$NCH$^{eq}$H$^{ax}$), 2.06 (s, 3H, CH$_3$N), 1.90 (m, 1H, CH$_3$NCH$_2$CH$^{eq}$H$^{ax}$) 1.58 (m, 2H, CH$_3$NCH$_2$CH$^{eq}$H$^{ax}$ and HNCH$_2$).

Aldimine AL9

28.06 g (0.099 mol) of 2,2-dimethyl-3-lauroyloxy-propanal were initially introduced under a nitrogen atmosphere in a round-bottomed flask. 10.00 g (0.095 mol) of 2-(2-aminoethoxy)ethanol (Diglycolamine® Agent; Huntsman) were added from a dropping funnel in the course of 3 minutes with vigorous stirring, the temperature of the reaction mixture increasing to 40° C. The volatile constituents were then removed in vacuo (10 mbar, 80° C.). 36.3 g of a colorless, clear and odorless liquid which had a low viscosity at room temperature and an amine content of 2.58 mmol $NH_2$/g were obtained. The product is present for the most part in the open-chain (aldimine) form.

IR: 3435br (O—H), 2954sh, 2922, 2852, 1736 (C=O), 1668 (C=N), 1466, 1418, 1394, 1375, 1248, 1233, 1160, 1127, 1062, 1022, 933, 893, 813, 721.

$^1$H-NMR (CDCl$_3$, 300K): δ 7.59 (s, 1H, CH=N), 4.03 (s, 2 H, CH$_2$O), 3.71 (m, 4H, HOCH$_2$CH$_2$OCH$_2$CH$_2$N), 3.58 (m, 4H, HOCH$_2$CH$_2$OCH$_2$CH$_2$N), 2.44 (br s, 1H, HOCH$_2$), 2.30 (t, 2H, CH$_2$CO), 1.61 (m, 2H, CH$_2$CH$_2$CO), 1.26 (m, 16H, CH$_3$—(CH$_2$)$_8$—CH$_2$CH$_2$CO), 1.11 (s, 6H, C(CH$_3$)$_2$—CH$_2$O)$_1$ 0.88 (t, 3H, CH$_3$—(CH$_2$)$_{10}$—CO).

Aldimine AL10

34.51 g (0.121 mol) of 2,2-dimethyl-3-lauroyloxy-propanal were initially introduced under a nitrogen atmosphere in a round-bottomed flask. 33.39 g of N-oleyl-1,3-propanediamine (Duomeen® 0, Akzo Nobel; amine number=337 mg KOH/g) were added from a dropping funnel in the course of 5 minutes with vigorous stirring, the temperature of the reaction mixture increasing to 48° C. The volatile constituents were then removed in vacuo (10 mbar, 80° C.). 65.7 g of a colorless, clear and odorless liquid which had a low viscosity at room temperature and an amine content of 3.07 mmol $NH_2$/g were obtained. The product is present for the most part in the open-chain (aldimine) form.

IR: 3307 (N—H), 3001sh, 2954sh, 2921, 2851, 1739 (C=O), 1668 (C=N), 1464, 1393, 1375, 1347, 1301, 1248, 1158, 1114, 1067, 1020, 1000, 968, 935, 889, 721.

$^1$H-NMR (CDCl$_3$, 300K): δ 7.53 (t, J=1.2) and 7.51 (s) (total 1H, ratio about 0.85/0.15), CH=N), 5.34 (m, 2H, CH$_2$CH=CHCH$_2$), 4.01 (s, 2H, CH$_2$O), 3.43 (t, 2H, CH=NCH$_2$CH$_2$), 2.60 (m, 4H, CH=NCH$_2$CH$_2$CH$_2$ and NHCH$_2$), 2.30 (t, 2H, CH$_2$CO), 2.01 (m, 4H, CH$_2$CH=CHCH$_2$), 1.75 (m, 2H, CH=NCH$_2$CH$_2$), 1.60 (m, 3H, CH$_2$CH$_2$CO and CH$_2$NHCH$_2$), 1.47 (m, 2H, CH$_2$NHCH$_2$CH$_2$), 1.26 (m, 38H, other CH$_2$ groups), 1.09 (s, 6H, C(CH$_3$)$_2$—CH$_2$O), 0.88 (t, 6H, both CH$_3$CH$_2$CH$_2$).

Aldimine AL11

40.00 g (0.141 mol) of 2,2-dimethyl-3-lauroyloxy-propanal were initially introduced under a nitrogen atmosphere in a round-bottomed flask. 24.00 g (0.128 mol) of N-(2-ethylhexyl)-1,3-propanediamine (BASF) were added from a dropping funnel in the course of 5 minutes with vigorous stirring, the mixture was heated to 80° C. and at the same time the volatile constituents were removed in vacuo (10 mbar). 61.5 g of a colorless, clear and odorless liquid which had a low viscosity at room temperature and an amine content of 4.12 mmol $NH_2$/g were obtained. The product is present for the most part in the open-chain (aldimine) form.

IR: 3322 (N—H), 2955, 2922, 2870sh, 2852, 2824sh, 1738 (C=O), 1668 (C=N), 1464, 1393, 1376, 1342, 1300, 1248, 1235, 1157, 1114, 1069, 1020, 1000, 935, 894, 873, 766, 723.

Aldimine AL12

35.00 g (0.123 mol) of 2,2-dimethyl-3-lauroyloxy-propanal were initially introduced under a nitrogen atmosphere in a round-bottomed flask. 36.31 g of N-tallow-alkyl-1,3-propanediamine (Duomeen® T, Akzo Nobel; amine number=346 mg KOH/g) at 50° C. were added in the course of 5 minutes with vigorous stirring, the mixture was heated to 80° C. and at the same time the volatile constituents were removed in vacuo (10 mbar). 69.2 g of a dirty white odorless body which was solid at room temperature and had an amine content of 3.20 mmol $NH_2$/g were obtained. The product is present for the most part in the open-chain (aldimine) form.

IR: 3316 (N—H), 2954sh, 2919, 2851, 2815sh, 1739 (C=O), 1668 (C=N), 1464, 1393, 1375, 1347, 1300, 1248, 1233, 1158, 1128sh, 1114, 1068, 1021, 1000, 968, 936, 917sh, 889, 873, 721.

Aldimine-Containing Compounds of Formula (I)

Aldimine-Containing Compound AC1

79.21 g (40.2 mmol OH) of polyoxypropylenediol (Acclaim® 4200 N, Bayer; OH number 28.5 mg KOH/g), 10.79 g (43.1 mmol) of 4,4'-methylenediphenyl diisocyanate (MDI; Desmodur® 44 MC L, Bayer) and 10.00 g of diisodecyl phthalate (DIDP; Palatinol® Z, BASF) were reacted at 80° C. to give an NCO-terminated polyurethane polymer having a content of 1.86% by weight of free isocyanate groups and a viscosity of 24 Pa·s at 20° C. 8.51 g (22.1 mmol) of aldimine AL1 were added to this polymer at room temperature and the mixture was thoroughly mixed by means of a centrifugal mixer (Speedmixer™ DAC 150, FlackTek Inc.). A clear, homogeneous and odorless liquid having a viscosity of 40 Pa·s at 20° C. was obtained.

Aldimine-Containing Compound AC2

79.21 g (40.2 mmol OH) of polyoxypropylenediol (Acclaim® 4200 N, Bayer; OH number 28.5 mg KOH/g), 10.79 g (43.1 mmol) of 4,4'-methylenediphenyl diisocyanate (MDI; Desmodur® 44 MC L, Bayer) and 10.00 g of diisodecyl phthalate (DIDP; Palatinol® Z, BASF) were reacted at 80° C. to give an NCO-terminated polyurethane polymer having a content of 1.86% by weight of free isocyanate groups and a viscosity of 24 Pa·s at 20° C. 10.62 g (14.8 mmol) of aldimine AL3 were added to this polymer at room temperature and the mixture was thoroughly mixed by means of a centrifugal mixer (SpeedMixer™ DAC 150, FlackTek Inc.). A clear, homogeneous and odorless liquid having a viscosity of 29 Pa·s at 20° C. was obtained.

Aldimine-Containing Compound AC3

1.74 g (13.9 mmol NCO) of 4,4'-diphenylmethane diisocyanate (MDI; Desmodur® 44 MC L, Bayer) were initially introduced under a nitrogen atmosphere in a round-bottomed flask and heated to 50° C. 10.00 g (13.9 mmol) of aldimine AL3 were added from a dropping funnel in the course of 5 minutes with thorough stirring and the mixture was stirred at 50° C. for one hour. A colorless, clear and odorless liquid which had a high viscosity at room temperature and an amine content of 2.37 mmol $NH_2/g$ and which had a neutral reaction to a moistened pH paper was obtained.

IR: 3300 (N—H), 2952sh, 2922, 2851, 1735 (C=O), 1664 (C=N), 1647sh, 1595, 1527sh, 1513, 1466, 1416, 1395, 1375, 1305, 1244, 1215, 1196, 1162, 1112, 1056, 1018, 1000, 939, 918sh, 851, 813, 777, 751, 721.

Aldimine-Containing Compound AC4

3.47 g (27.7 mmol NCO) of 4,4'-diphenylmethane diisocyanate (MDI; Desmodur® 44 MC L, Bayer) were initially introduced under a nitrogen atmosphere in a round-bottomed flask and heated to 50° C. 10.00 g (13.9 mmol) of aldimine AL3 were added from a dropping funnel in the course of 5 minutes with thorough stirring and the mixture was stirred at 50° C. for one hour. A pale yellow, clear and odorless liquid which had a high viscosity at room temperature and which had a neutral reaction to a moistened pH paper was obtained.

IR: 3308 (N—H), 2954sh, 2922, 2852, 2266 (N=C=O), 1735 (C=O), 1665 (C=N), 1596, 1526sh, 1514, 1467, 1415, 1395, 1374, 1306, 1244, 1216, 1197, 1162, 1110, 1059, 1018, 1000, 940, 918sh, 854, 813, 781, 751, 721.

Aldimine-Containing Compound AC5

12.94 g (103.4 mmol NCO) of 4,4'-diphenylmethane diisocyanate (MDI; Desmodur® 44 MC L, Bayer) were initially introduced under a nitrogen atmosphere in a round-bottomed flask and heated to 50° C. 42.16 g (51.7 mmol) of aldimine AL4 were added from a dropping funnel in the course of 10 minutes with thorough stirring and the mixture was stirred at 50° C. for one hour. A light yellow, clear and odorless liquid which had a high viscosity at room temperature and which had a neutral reaction to a moistened pH paper was obtained.

IR: 3336 (N—H), 2922, 2852, 2265 (N=C=O), 1736 (C=O), 1666 (C=N), 1640, 1594, 1513, 1488, 1465, 1416, 1394, 1373, 1307, 1237, 1169, 1110, 1065, 1018, 1000sh, 932, 918sh, 848, 812, 776, 754, 723.

Aldimine-Containing Compound AC6

10.00 g (51.4 mmol NCO) of 1,6-hexamethylene diisocyanate trimer (Desmodur® N-3300, Bayer; NCO content=21.61% by weight) were dissolved in 47.05 g of dry ethyl acetate under a nitrogen atmosphere in a round-bottomed flask. 37.05 g (102.9 mmol) of aldimine AL3 were added from a dropping funnel in the course of 10 minutes with thorough stirring at room temperature and the mixture was stirred for one hour. A colorless, clear and odorless liquid which had a low viscosity at room temperature and an amine content of 1.11 mmol $NH_2/g$ and which had a neutral reaction to moistened pH paper was obtained.

IR: 3422 (N—H), 3308 (N—H), 2954, 2924, 2853, 1727 (C=O), 1689, 1651, 1600, 1579, 1528, 1462, 1377, 1334, 1272, 1161, 1121, 1072, 1039, 995, 948, 870, 764, 742, 704.

Compositions (Plastic Precursor)

Examples 1 to 7 and Example 8 (Comparison)

For each example, 100.0 g of polyurethane polymer PP1, whose preparation is described below, were weighed into a polypropylene beaker having a screw closure and placed under dry nitrogen. 0.3 g of a salicylic acid solution (5% by weight in dioctyl adipate) was added thereto and the aldimine of the formula (XI) mentioned in table 1 was added in the stated amount, the mixture was thorough mixed by means of a centrifugal mixer (SpeedMixer™ DAC 150, FlackTek Inc.) and immediately thereafter filled into an internally coated aluminum tube and the latter was closed air-tight. For all examples, the amount of added aldimine of the formula (XI) corresponds to a ratio of 1.0/0.7 between the isocyanate groups in the polyurethane polymer and the sum of the reactive groups (aldimino groups plus amino and hydroxyl groups) in the aldimine.

The polyurethane polymer PP1 was prepared as follows:

1300 g of polyoxypropylenediol (Acclaim® 4200 N, Bayer; OH number 28.5 mg KOH/g), 2600 g of polyoxypropylene polyoxyethylenetriol (Caradol® MD34-02, Shell; OH number 35.0 mg KOH/g), 605 g of 4,4'-methylenediphenyl diisocyanate (MDI; Desmodur® 44 MC L, Bayer) and 500 g of diisodecyl phthalate (DIDP; Palatinol® Z, BASF) were reacted at 80° C. to give an NCO-terminated polyurethane polymer having a content of 2.07% by weight of free isocyanate groups and a viscosity of 48 Pa·s at 20° C.

The compositions thus obtained were tested for shelf-life, skin formation time, bubble formation, odor and mechanical properties after curing.

The shelf-life was determined via the change in the viscosity during storage at elevated temperature. For this purpose, the plastic precursor was stored in a closed tube in an oven at 60° C. and its viscosity was measured firstly after a duration of storage of 12 hours and secondly after a duration of storage of 7 days. The shelf-life is obtained from the percentage increase in the second viscosity value compared with the first one.

The results of the tests are shown in table 1.

TABLE 1

Composition and shelf-life of plastic precursors.

| Example | Aldimine of the formula (I) | Aldimine addition [g] | [NCO] / [[OH] + [NH]] | Viscosity increase [%][a] |
|---|---|---|---|---|
| (Ref)[b] | — | — | — | 16 |
| 1 | AL1 | 6.6 | 1.0/0.7 | 18 |
| 2 | AL2 | 7.9 | 1.0/0.7 | 26 |
| 3 | AL3 | 8.3 | 1.0/0.7 | 18 |
| 4 | AL4 | 9.4 | 1.0/0.7 | 25 |
| 5 | AL5 | 8.5 | 1.0/0.7 | 27 |
| 6 | AL6 | 7.8 | 1.0/0.7 | 13 |
| 7 | AL7 | 11.2 | 1.0/0.7 | 23 |
| 8 (comparison) | AL8 | 4.9 | 1.0/0.7 | 42 |

[a] = (viscosity after 7 d/viscosity after 12 h − 1) × 100%.
[b] reference example without aldimine.

Table 1 shows that the compositions of examples 1 to 7, which contain aldimine-containing compounds of the formula (I) which were prepared in situ from the polyurethane polymer PP1 and the aldimines AL1 to AL7 of the formula (XI), have a large viscosity increase after storage in comparison with the composition of the reference example, which contains no aldimine-containing compound. In comparison, the viscosity of the plastic precursor of comparative example 8, which contains an aldimine-containing compound according to the prior art which was prepared in situ from the polyurethane polymer PP1 and the aldimine AL8, increases substantially more strongly.

For the determination of the skin formation time (tack-free time), a small part of the plastic precursor stored for 12 hours at 60° C. and now at room temperature was applied in a layer thickness of 3 mm to cardboard, and the time taken on gentle tapping of the plastic surface by means of an LDPE pipette, for no residue to remain behind on the pipette for the first time was determined at 23° C. and 50% relative humidity.

For the determination of the mechanical properties after curing, a further part of the plastic precursor stored for 12 hours at 60° C. was cast as a film of about 2 mm thickness in a PTFE-coated metal sheet, whereupon the film was allowed to cure for 7 days at 23° C. and 50% relative humidity to give a resilient plastic. The plastic film thus produced was tested according to DIN EN 53504 with regard to tensile strength, elongation at break and modulus of elasticity (traction speed: 200 mm/min). In addition, the bubble formation (on the basis of the quantity of bubbles which occurred during the curing of the film) and the odor (by smelling with the nose at a distance of 10 cm, first on freshly cast film and again on the completely cured film) were qualitatively assessed. The lightfastness was determined by exposing the cured plastic film to sunlight for two weeks at 23° C. and 50% relative humidity and testing the exposed surface for polymer decomposition.

The results of the tests are shown in table 2.

TABLE 2

Properties during and after the curing of the plastic precursors.

| | Example | | | | | | | |
|---|---|---|---|---|---|---|---|---|
| | 1 | 2 | 3 | 4 | 5 | 6 | 7 | 8 (comp.) |
| Skin formation (min.) | 35 | 45 | 35 | 50 | 40 | 35 | 45 | 90 |
| Bubble formation | none | none | none | none | none | none | none | few |
| Tensile strength (MPa) | 0.8 | 1.0 | 0.8 | 0.7 | 0.7 | 0.7 | 1.0 | 1.0 |
| Elongation at break (%) | 180 | 200 | 60 | 70 | 80 | 130 | 220 | 240 |
| Modulus of elasticity (MPa)$^a$ | 1.3 | 1.4 | 2.3 | 1.7 | 1.6 | 1.3 | 1.3 | 1.1 |
| Odor | none | none | none | none | none | none | none | strong |
| Lightfastness | good$^b$ | good$^b$ | good$^b$ | good$^b$ | good$^b$ | good$^b$ | good$^b$ | decomposition$^c$ |

$^a$at 0.5-5.0% elongation.
$^b$stable (dry surface).
$^c$decomposition (smeary surface)

Table 2 shows that the compositions of examples 1 to 7, which in each case contain an aldimine-containing compound of the formula (I) according to the invention which is prepared in situ, cure rapidly and without bubble formation, are odorless and, in the cured state, have lightfast and good mechanical properties. In comparison, the plastic precursor of comparative example 8, which contains an aldimine-containing compound according to the prior art which is prepared in situ, cures more slowly and with partial bubble formation, is not lightfast and has a strong odor.

Examples 9 and 10

In each case one of the aldimine-containing compounds of the formula (I) which are shown in table 3 was weighed, together with the polyurethane polymer PP2, this preparation is described below, in the stated amounts into a polypropylene beaker having a screw closure and placed under dry nitrogen. 0.3 g of a salicylic acid solution (5% by weight in dioctyl adipate) was added thereto, the mixture was thoroughly mixed by means of a centrifugal mixer (SpeedMixer™ DAC 150, FlackTek Inc.) and immediately thereafter filled into an internally coated aluminum tube and the latter was closed air-tight. The amount of added aldimine-containing compound of the formula (I) corresponds to a ratio of 1/1 between the isocyanate groups in the polyurethane polymer and the aldimino groups in the compound of the formula (I).

The polyurethane polymer PP2 was prepared as follows:

3960 g of polyoxypropylenediol (Acclaim® 4200 N, Bayer; OH number 28.5 mg KOH/g), 540 g of 4,4'-methylene-diphenyl diisocyanate (MDI; Desmodur® 44 MC L, Bayer) and 500 g of diisodecyl phthalate (DIDP; Palatinol® Z, BASF) were reacted at 80° C. to give an NCO-terminated polyurethane polymer having a titrimetrically determined content of 1.86% by weight of free isocyanate groups and a viscosity of 24 Pa·s at 20° C.

TABLE 3

Composition of the plastic precursors of examples 9 and 10.

| Example | Polyurethane polymer PP2 | Aldimine-containing compound |
|---|---|---|
| 9 | 23.04 g | AC1, 26.96 g |
| 10 | 30.13 g | AC2, 19.87 g |

The plastic precursors thus obtained were tested by the methods described for example 1 with regard to shelf-life, skin formation time, bubble formation, odor and mechanical properties after curing and by the method described for example 24 with regard to tack.

The results of the tests are shown in table 4.

TABLE 4

Shelf-life, properties during and after curing of plastic precursors.

| | Example | |
|---|---|---|
| | 9 | 10 |
| Viscosity increase in % | 6 | 13 |
| Skin formation time (min.) | 16 | 18 |
| Bubble formation | none | none |
| Tack | none | none |
| Tensile strength (MPa) | 3.5 | 1.0 |
| Elongation at break (%) | 2100 | 90 |
| Modulus of elasticity (MPa)$^a$ | 1.1 | 1.9 |
| Odor | none | none |

$^a$at 0.5-5.0% elongation.

Table 4 shows that the plastic precursors of examples 9 and 10, which in each case contain an aldimine-containing compound of the formula (I) AC1 and AC2, show only a slight viscosity increase during storage.

In their application, they cure rapidly and without bubble formation, are odorless and, in the cured state, have good mechanical properties.

Plastic Precursors which can be Used as Adhesives

Examples 11 to 18 and Example 19 (comparison)

For each of the examples, the substances shown in table 5 were processed in the stated amount (in parts by weight) in a vacuum mixer in the absence of moisture to give a lump-free, homogeneous paste, the latter was immediately filled into an internally coated aluminum cartridge and the cartridge was closed air-tight. The polyurethane polymers PP1 and PP2 were prepared as described in example 1 and example 9, respectively.

The polyaldimine PA1 was prepared from the condensation reaction between 1,6-hexamethylenediamine and 2,2-dimethyl-3-lauroyloxypropanal (in the molar ratio between amino and aldehyde groups of 1:1.05) and had an amine content of 2.94 mmol $NH_2$/g.

The polyaldimine PA2 was prepared from the condensation reaction between alpha,omega-polyoxypropylenediamine (Jeffamine® D-230, Huntsman; amine content=8.29 mmol $NH_2$/g) and 2,2-dimethyl-3-lauroyloxypropanal (in the molar ratio between the amino and aldehyde groups of 1:1.05) and had an amine content of 2.50 mmol $NH_2$/g.

The ratio between the isocyanate groups in the polyurethane polymer and the sum of the reactive groups (aldimino groups plus amino and hydroxyl groups) in the aldimine-containing compounds of the formula (I), in the aldimines of the formula (XI) and in the polyaldimines is 1.0/0.7 for all examples.

overlap region between the small plates was filled with adhesive, which came to rest on the activated sides of the small plates. The adhesive was cured for 7 days at 23° C. and 50% relative humidity, and the breaking strength was then determined with the aid of a tensile tester at a constant crossbeam speed of 20 mm/min according to DIN EN 1465. The stated values are mean values of three measurements.

The adhesion on glass was determined on the basis of the fracture pattern on the test specimen used for determining the tensile shear strength, after the test was complete. A 100% cohesive fracture, i.e. taking place completely in the adhesive, was rated with the value "1", while a 0% cohesive fracture, i.e. taking place completely between glass surface and adhesive and therefore an adhesive fracture, was rated with the value "5". Adhesions with cohesion fracture values of less than 75% are considered to be inadequate.

The other tests were carried out as described in example 1.

Table 6 shows that the adhesives of examples 11 to 18, which contain aldimine-containing compounds of the for-

TABLE 5

Composition of adhesives.

| | Example | | | | | | | | |
|---|---|---|---|---|---|---|---|---|---|
| | 11 | 12 | 13 | 14 | 15 | 16 | 17 | 18 | 19 (comp.) |
| Polyurethane polymer | PP1, 50.0 | PP1, 50.0 | PP1, 50.0 | PP2, 50.0 | PP2, 50.0 | PP2, 50.0 | PP2, 50.0 | PP2, 50.0 | PP1, 50.0 |
| Aldimine(s) of the formula(XI) | AL1, 3.3 | AL2, 3.9 | AL6, 3.9 | AL1, 1.8; AL3, 1.9 | AL4, 1.9 | — | — | — | AL8, 2.5 |
| Aldimine-containing compound of the formula (I)[a] | — | — | — | — | — | AC3, 2.6 | AC4, 3.0 | AC5, 2.5 | — |
| Polyaldimine | — | — | — | — | PA1, 2.9 | PA2, 3.7 | PA2, 2.5 | PA1, 2.9 | — |
| Plasticizer[b] | 12.2 | 11.6 | 11.6 | 11.8 | 10.7 | 9.9 | 10.6 | 10.7 | 13.0 |
| Kaolin | 17.0 | 17.0 | 17.0 | 17.0 | 17.0 | 17.0 | 17.0 | 17.0 | 17.0 |
| Carbon black | 17.0 | 17.0 | 17.0 | 17.0 | 17.0 | 17.0 | 17.0 | 17.0 | 17.0 |
| Drying agent[c] | 0.1 | 0.1 | 0.1 | 0.1 | 0.1 | 0.1 | 0.1 | 0.1 | 0.1 |
| Epoxy-silane[d] | 0.3 | 0.3 | 0.3 | 0.3 | 0.3 | 0.3 | 0.3 | 0.3 | 0.3 |
| Catalyst[e] | 0.1 | 0.1 | 0.1 | 0.1 | 0.1 | 0.1 | 0.1 | 0.1 | 0.1 |

[a]aldimine-containing compound of the formula (I).
[b]diisodecyl phthalate (DIDP; Palatinol ® Z, BASF).
[c]p-tosyl isocyanate.
[d]3-glycidyloxypropyltrimethoxysilane (Silquest ® A-187, OSi Crompton).
[e]salicylic acid (5% by weight in dioctyl adipate).

The adhesives thus obtained were tested with regard to skin formation time, odor and mechanical properties after curing and with regard to adhesion properties on glass. The results of the tests are shown in table 6.

The Shore A hardness was determined according to DIN 53505.

For testing the tensile shear strength, 2 small glass plates each of 6 mm thickness, 25 mm width and 75 mm length (float glass; from Rocholl, Schönbrunn, Germany) were pretreated with Sika® activator (obtainable from Sika Schweiz AG) for each measurement. After a drying time of 10 minutes in air, the small plates were arranged with the aid of a suitable PTFE mold at a vertical distance of 5 mm relative to one another in such a way that they overlapped at the top ends by 10 mm. The mula (I) which were prepared in examples 11 to 15 in the course of the adhesive preparation (in situ) from aldimines of the formula (XI) and the polyurethane polymers PP1 or PP2 and prepared beforehand in examples 16 to 18 and, in some cases combined with polyaldimines, were mixed into the adhesive, cure rapidly, are odorless and, in the cured state, have very good mechanical properties. In contrast, the adhesive of comparative example 36, which contains an aldimine-containing compound according to the prior art which was prepared in situ from the aldimine AL8 and the polyurethane polymer PP1, cures more slowly, has a strong odor and has insufficient adhesion to glass.

TABLE 6

Properties during and after the curing of the adhesives

| | Example | | | | | | | | |
|---|---|---|---|---|---|---|---|---|---|
| | 11 | 12 | 13 | 14 | 15 | 16 | 17 | 18 | 19 (comp.) |
| Skin formation time[a] | 23 | 27 | 18 | 40 | 60 | 68 | 80 | 50 | 90 |
| Odor | none | none | none | none | none | none | none | none | strong |
| Shore A hardness | 53 | 60 | 58 | 54 | 65 | 56 | 56 | 66 | 56 |
| Tensile strength (MPa) | 9.7 | 9.9 | 9.9 | 10.2 | 9.1 | 8.1 | 9.0 | 7.0 | 9.6 |
| Elongation at break (%) | 650 | 590 | 530 | 720 | 530 | 700 | 650 | 450 | 550 |
| Modulus of elasticity (MPa)[b] | 3.6 | 4.6 | 4.0 | 3.3 | 7.3 | 4.1 | 4.0 | 9.0 | 4.0 |
| Tensile shear strength[c] | 8.6 | 7.5 | 10.1 | 9.9 | 8.5 | 6.3 | 6.7 | 6.4 | 3.9 |
| Adhesion on glass | 1 | 1 | 1 | 1 | 1 | 1 | 1 | 1 | 5 |

Composition of adhesives.
[a] in minutes.
[b] at 0.5-5.0% elongation.
[c] in MPa.

Examples 20 to 22 and Example 23 (Comparison)

For each of the examples, the substances shown in table 7 were processed in the stated amount (in parts by weight) in a vacuum mixer in the absence of moisture to give a lump-free, homogeneous paste, and the latter was immediately filled into an internally coated aluminum cartridge and the cartridge was closed air-tight.

The polyurethane polymer PP2 was prepared as described in example 9. The polyurethane polymer PP3 was prepared as follows:

2000 g of polyoxypropylenediol (Acclaim® 4200 N, Bayer; OH number 28.5 mg KOH/g), 1935 g of polyoxypropylene-triol (Acclaim® 6300 N, Bayer; OH number 28.0 mg KOH/g), 535 g of 4,4'-methylenediphenyl diisocyanate (MDI; Desmodur® 44 MC L, Bayer) and 500 g of diisodecyl phthalate (DIDP; Palatinol® Z, BASF) were reacted at 80° C. to give an NCO-terminated polyurethane polymer having a titrimetrically determined content of 1.84% by weight of free isocyanate groups and a viscosity of 56 Pa·s at 20° C.

The polyaldimine PA2 was prepared as described in example 11.

The ratio between the isocyanate groups in the polyurethane polymer and the sum of the reactive groups (aldimino groups plus amino and hydroxyl groups) in the aldimine-containing compound of the formula (I) [including the reacted amino group], in the aldimines of the formula (XI) and in the polyaldimine is 1.0/0.45 for all examples.

TABLE 7

Composition of the adhesives of examples 20 to 22 and example 23 (comparison).

| | Example | | | |
|---|---|---|---|---|
| | 20 | 21 | 22 | 23 (comp.) |
| Polyurethane polymer | PP3, 50.0 | PP2, 50.0 | PP2, 50.0 | PP3, 50.0 |
| Aldimine | AL1, 1.9 | AL3, 2.4 | — | — |
| Aldimine-containing compound | — | — | AC4, 3.2 | — |
| Polyaldimine | — | — | — | PA2, 3.9 |
| Plasticizer[a] | 13.1 | 12.6 | 11.8 | 10.8 |
| Kaolin | 17.0 | 17.0 | 17.0 | 17.0 |
| Carbon black | 17.0 | 17.0 | 17.0 | 17.0 |
| Drying agent[b] | 0.2 | 0.2 | 0.2 | 0.2 |
| Epoxysilane[c] | 0.3 | 0.3 | 0.3 | 0.3 |
| Acid catalyst[d] | 0.2 | 0.2 | 0.2 | 0.2 |
| Tin catalyst[e] | 0.3 | 0.3 | 0.3 | 0.3 |

[a] diisodecyl phthalate (DIDP; Palatinol ® Z, BASF).
[b] p-tosyl isocyanate.
[c] 3-glycidyloxypropyltrimethoxy-silane (Silquest ® A-187, OSi Crompton).
[d] salicylic acid (5% by weight in dioctyl adipate).
[e] di-n-butyltin dilaurate (2% by weight in diisodecyl phthalate).

The adhesive thus obtained was tested with regard to skin formation time, green strength and mechanical properties after curing. The results of the tests are shown in table 8.

The green strength was determined as follows: two small glass plates per test, measuring 40×100×6 mm, were pretreated with Sika® activator (obtainable from Sika Schweiz AG) on the side to be adhesively bonded. After a drying time of 10 minutes in air, the adhesive was applied in the form of a triangular bead parallel to the longitudinal edge on one of the small glass plates. After about one minute, the applied adhesive was pressed for the use of the second small glass plate by means of a tensile tester (Zwick) to 5 mm adhesive thickness (corresponding to an adhesive joint width of about 1 cm) and then stored at 23° C. and 50% relative humidity. In this way, two times three test specimens were produced and in each case three thereof were tested after curing time of 4 and 7 hours with regard to green strength. For this purpose, the test specimens were pulled apart on the tensile tester at a constant traction speed of 200 mm/min, the maximum force for this purpose in N/mm bead length was registered and the energy consumption up to fracture in J was determined by integration of the force-elongation curve until fracture of the sample and the values obtained were in each case averaged over the three samples.

TABLE 8

Properties during and after curing of the adhesives of examples 20 to 22 and example 23 (comparison).

| | Example | | | |
|---|---|---|---|---|
| | 20 | 21 | 22 | 23 (comp.) |
| Skin formation time (min.) | 25 | 45 | 65 | 34 |
| Max. tensile force after 4 h (N/mm) | 75 | 52 | 55 | 38 |
| Tensile energy after 4 h (J) | 10.4 | 8.2 | 7.2 | 3.5 |
| Max. tensile force after 7 h (N/mm) | 135 | 86 | 97 | 76 |
| Tensile energy after 7 h (J) | 18.7 | 11.5 | 12.3 | 8.1 |
| Shore A hardness | 58 | 50 | 59 | 56 |
| Tensile strength (MPa) | 9.6 | 7.1 | 6.9 | 9.8 |
| Elongation at break (%) | 700 | 630 | 640 | 720 |
| Modulus of elasticity (MPa)$^a$ | 3.4 | 2.5 | 3.9 | 4.3 |

$^a$at 0.5-5.0% elongation.

Table 8 shows that the adhesives of examples 20 to 22 which contain aldimine-containing compounds of the formula (I) which were prepared in examples 20 and 21 in the course of the adhesive preparation (in situ) from aldimines of the formula (XI) and the polyurethane polymers PP2 or PP3 and prepared beforehand in example 22 and mixed together with a polyaldimine into the adhesive show a rapid buildup in strength, i.e. a high green strength, and, after complete curing, have very good mechanical properties. In comparison, the adhesive of comparative example 23 according to the prior art, which contains as an aldimine-containing compound exclusively a dialdimine, has a substantially slower buildup in strength in combination with comparable mechanical properties after complete curing.

Plastic Precursors which can be Used as Sealants

Examples 24 to 31 and Example 32 (Comparison)

For each of the examples, the substances shown in table 9 were processed in the stated amount (in parts by weight) in a vacuum mixer in the absence of moisture to give a lump-free, homogeneous paste, the latter was immediately filled into an internally coated aluminum cartridge and the cartridge was closed air-tight.

The polyurethane polymer PP4 was prepared as follows:
3560 g of polyoxypropylenediol (Acclaim® 4200 N, Bayer; OH number 28.1 mg KOH/g), 1000 g of polyoxypropylene-triol (Acclaim® 6300, Bayer; OH number 28.0 mg KOH/g) and 440 g of toluylene diisocyanate (TDI; Desmodur® T 80 P, Bayer) were reacted at 80° C. to give an NCO-terminated polyurethane polymer having a titrimetrically determined content of 2.21% by weight of free isocyanate groups and a viscosity of 14 Pa·s at 20° C.

The polyurethane polymer PP5 was prepared as follows:
4560 g of polyoxypropylenediol (Acclaim® 4200 N, Bayer; OH number 28.1 mg KOH/g) and 440 g of toluylene diisocyanate (TDI; Desmodur® T 80 P, Bayer) were reacted at 80° C. to give an NCO-terminated polyurethane polymer having a titrimetrically determined content of 2.22% by weight of free isocyanate groups and a viscosity of 11 Pa·s at 20° C.

The polyaldimine PA2 was prepared as described in example 11.

The urea thickener was prepared as follows:
3000 g of diisodecyl phthalate (DIDP; Palatinol® Z, BASF) and 480 g of 4,4'-methylenediphenyl diisocyanate (MDI; Desmodur® 44 MC L, Bayer) were initially introduced into a vacuum mixer and gently heated up. 270 g of monobutylamine were then slowly added dropwise with vigorous stirring. The resulting paste was further stirred in vacuo and with cooling for one hour.

The ratio between the isocyanate groups in the polyurethane polymer and the sum of the reactive groups (aldimino groups plus amino and hydroxyl groups) in the aldimines of the formula (XI) and the polyaldimines is 1.0/0.67 for all examples.

TABLE 9

Composition of the sealants of examples 24 to 31 and example 32 (comparison).

| | Example | | | | | | | | |
|---|---|---|---|---|---|---|---|---|---|
| | 24 | 25 | 26 | 27 | 28 | 29 | 30 | 31 | 32 (comp.) |
| Polyurethane polymer | PP4, 24.0 | PP4, 24.0 | PP4, 24.0 | PP4, 24.0 | PP4, 24.0 | PP5, 24.0 | PP5, 24.0 | PP5, 24.0 | PP4, 24.0 |
| Aldimine(s) of the formula (XI) | AL1, 1.6 | AL2, 2.7 | AL6, 1.9 | AL11, 2.1 | AL12, 2.6 | AL1, 1.0; AL3, 0.7 | AL9, 1.1; AL3, 0.7 | AL10, 1.8; AL3, 0.7 | — |
| Polyaldimine | — | — | — | — | — | — | — | — | PA2, 3.3 |
| Plasticizer$^a$ | 3.4 | 2.3 | 3.1 | 2.9 | 2.4 | 3.3 | 3.2 | 2.5 | 1.5 |
| Chalk | 38.0 | 38.0 | 38.0 | 38.0 | 38.0 | 38.0 | 38.0 | 38.0 | 38.0 |
| Thickener | 28.0 | 28.0 | 28.0 | 28.0 | 28.0 | 28.0 | 28.0 | 28.0 | 28.0 |
| Titanium dioxide | 4.5 | 4.5 | 4.5 | 4.5 | 4.5 | 4.5 | 4.5 | 4.5 | 4.5 |

TABLE 9-continued

Composition of the sealants of examples 24 to 31 and example 32 (comparison).

| | Example | | | | | | | | |
|---|---|---|---|---|---|---|---|---|---|
| | 24 | 25 | 26 | 27 | 28 | 29 | 30 | 31 | 32 (comp.) |
| Epoxy silane[c] | 0.2 | 0.2 | 0.2 | 0.2 | 0.2 | 0.2 | 0.2 | 0.2 | 0.2 |
| Catalyst[d] | 0.3 | 0.3 | 0.3 | 0.3 | 0.3 | 0.3 | 0.3 | 0.3 | 0.5 |

[a]diisodecyl phthalate (DIDP; Palatinol ® Z, BASF).
[b]urea thickener.
[c]3-glycidyloxypropyltriethoxysilane (Dynasylan ® GLYEO, Degussa).
[d]salicylic acid (5% by weight in dioctyl adipate).

The sealants thus obtained were tested with regard to skin formation time, through-curing rate and mechanical properties after curing. The through-curing rate was determined by applying the sealant by means of a cartridge gun through a round tip (opening 10 mm) as a horizontal, freely suspended cone having a length of about 50 mm and a thickness in the middle of 30 mm onto a piece of cardboard fastened to the wall, leaving it for 7 days under standard climatic conditions, then cutting it open vertically along the middle and measuring the thickness of the cured sealant layer using a ruler. The Shore A hardness was determined according to DIN 53505 on test specimens cured for 14 days under standard climatic conditions. The other tests were carried out as described in example 1 and example 11.

The results of the tests are shown in table 10.

TABLE 10

Properties during and after curing of the sealants of examples 24 to 31 and example 32 (comparison).

| | Example | | | | | | | | |
|---|---|---|---|---|---|---|---|---|---|
| | 24 | 25 | 26 | 27 | 28 | 29 | 30 | 31 | 32 (comp.) |
| Skin formation time[a] | 65 | 160 | 35 | 55 | 90 | 70 | 50 | 100 | 65 |
| Through-curing[b] | 15 | 12 | 10 | 9 | 7 | 15 | 15 | 12 | 4 |
| Shore A hardness | 31 | 24 | 35 | 33 | 25 | 30 | 34 | 26 | 31 |
| Tensile strength (MPa) | 1.8 | 1.3 | 2.2 | 2.4 | 1.1 | 2.2 | 2.1 | 1.5 | 1.8 |
| Elongation at break (%) | 1480 | 1550 | 1420 | 1440 | 1470 | 1210 | 1240 | 1260 | 1040 |
| Stress at 100% elongation (MPa) | 1.0 | 0.6 | 1.2 | 0.9 | 0.7 | 0.8 | 1.0 | 0.6 | 1.4 |

[a]in minutes.
[b]in mm.

Table 10 shows that the sealants according to the invention of examples 24 to 31, which contain aldimine-containing compounds of the formula (I) which are prepared in the course of the sealant preparation (in situ) from aldimines of the formula (XI) and the polyurethane polymers PP4 or PP5, cure rapidly, and in the cured state, have very good mechanical properties, in particular high extensibility and low stress at 100% elongation. In comparison, the sealant of comparative example 32 according to the prior art, which contains the polyaldimine PA2, cures more slowly and, in the cured state, has less advantageous mechanical properties.

Plastic Precursors which can be Used as Coatings

Example 33

A mixture of 1 g of carbodiimide-modified MDI (Desmodur® CD, Bayer), 5.1 g of aldimine-containing compound AC6, 0.1 g of 3-glycidyloxypropyltrimethoxy-silane and a pinch of salicylic acid were diluted to a solids content of 50% by weight with ethyl acetate, and the solution obtained was applied by means of a brush in a very thin layer to a glass plate (float glass; from Rocholl, Schonbrunn, Germany) cleaned beforehand with heptane and was allowed to stand in a standard climate (23° C., 50% relative humidity). After 45 minutes, a nontacky, glossy transparent and readily adhering film having a completely dry surface had formed. The remaining solution which had not been applied could be stored in a climatically sealed vessel for several weeks without significant increase in viscosity.

Example 34

A mixture of 1 g of polyurethane polymer PP6, whose preparation is described below, 0.67 g of aldimine-containing compound AC6, 0.1 g of 3-glycidyloxypropyl-trimethoxysilane and a pinch of salicylic acid were diluted to a solids content of 50% by weight with ethyl acetate, and the solution obtained was applied by means of a brush in a very thin layer to a glass plate (float glass; from Rocholl, Schonbrunn, Germany) cleaned beforehand with heptane and was allowed to stand in a standard climate (23° C., 50% relative humidity). After 70 minutes, an untacky, glossy transparent and readily adhering film having a completely dry surface had formed. The remaining solution which had not been applied could be stored in a climatically sealed vessel for several weeks without significant increase in viscosity.

The polyurethane polymer PP6 was prepared as follows:

1 g of polyoxypropylenediol (Desmophen® 1112 BD, Bayer; OH number 112 mg KOH/g), 4.06 g of IPDI trimer (Vestanat® T 1890/100, Degussa) and 5.06 g of ethyl acetate were reacted by a known process at 60° C. to give a polyurethane polymer having a titrimetrically determined content of 3.94% by weight of free isocyanate groups.

The invention claimed is:

1. A composition containing:
   (i) at least one isocyanate-containing polyurethane polymer P which is prepared from at least one polyisocyanate and at least one polyol; and
   (ii) at least one aldimine-containing compound of the formula (I)

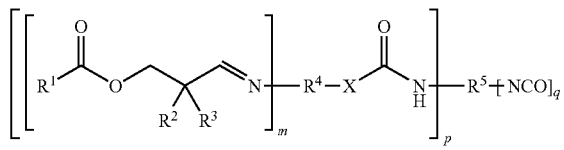

in which
   m is an integer from 1 to 4,
   p is an integer from 1 to 6, and
   q is an integer from 0 to 5,
   with the proviso that p+q=2 to 6;
   R1 either is:
      a monovalent hydrocarbon radical having 6 to 30 C atoms, which optionally has at least one heteroatom, or
      a substituent of the formula (II)

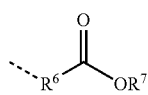

in which
   R6 is a divalent hydrocarbon radical having 2 to 20 C atoms, which optionally has at least one heteroatom, and
   R7 is a monovalent hydrocarbon radical having 1 to 20 C atoms;
   R2 and R3 either, independently of one another, are each a monovalent hydrocarbon radical having 1 to 12 C atoms; or together form a divalent hydrocarbon radical having 4 to 20 C atoms, which is part of an optionally substituted carbocyclic ring having 5 to 8 C atoms;
   R4 is an (m+1)-valent hydrocarbon radical having 2 to 12 C atoms which optionally contains at least one heteroatom, R5 either is:
      a (p+q)-valent organic radical optionally containing heteroatoms, as is obtained by removing p+q NCO groups from R5 [NCO]p+q, or
      N, NR14, O, OC(O)O, Si, P(O)O3 or SO2, in which R14 is a monovalent hydrocarbon radical having 1 to 20 C atoms; and
   X is O, S or NR8, in which R8 either is:
      a monovalent hydrocarbon radical having 1 to 20 C atoms which optionally has at least one carboxylic acid ester, nitrile, nitro, phosphonic acid ester, sulfone or sulfonic acid ester group, or
      a substituent of the formula (III)

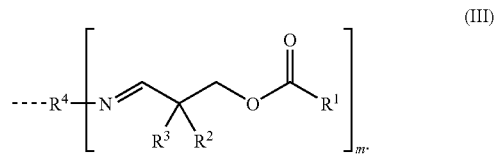

2. The composition as claimed in claim 1, wherein R2 and R3 are identical.

3. The composition as claimed in claim 1, wherein m is 2 or 1.

4. The composition as claimed in claim 1, wherein X either is a monovalent hydrocarbon radical having 1 to 20 C atoms or is NR8 and R8 is a monovalent hydrocarbon radical of the formula (IX) or (IX')

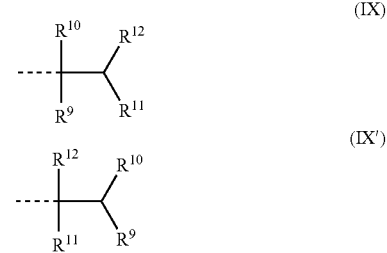

in which
   R9 is a radical selected from the group consisting of COOR13, CN, NO2, PO(OR13)2, SO2R13 and SO2OR13;
   R10 is a hydrogen atom or a radical selected from the group consisting of R13, COOR13 and CH2COOR13 and
   R11 and R12, independently of one another, are a hydrogen atom or a radical selected from the group consisting of R13, COOR13 and CN, where R13 being a monovalent hydrocarbon radical having 1 to 20 C atoms.

5. The composition as claimed in claim 1, wherein X is O or S.

6. The composition as claimed in claim 1, wherein the compound of the formula (I) is prepared by reacting an aldimine of the formula (XI) with a polyisocyanate D of the formula (XII)

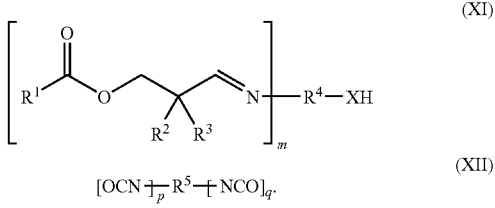

7. The composition as claimed in claim 6, wherein the aldimine of the formula (XI) is used in a ratio of one mole equivalent of active hydrogen of the aldimine to one mole equivalent of isocyanate groups of the polyisocyanate D.

8. The composition as claimed in claim 6, wherein the aldimine of the formula (XI) is used in a ratio of less than one mole equivalent of active hydrogen of the aldimine to one mole equivalent of isocyanate groups of the polyisocyanate D.

9. The composition as claimed in claim 1, wherein the polyisocyanate which is used for the preparation of the polyurethane polymer P is selected from the group consisting of 2,4- and 2,6-toluylene diisocyanate (TDI); 4,4'-, 2,4'- and 2,2'-diphenylmethane diisocyanate (MDI); 1,6-hexamethylene diisocyanate (HDI); and 1-isocyanato-3,3,5-trimethyl-5-isocyanatomethylcyclohexane (IPDI).

10. The composition as claimed in claim 1, further comprising at least one polymer which has organoalkoxysilane groups.

11. The composition as claimed in claim 1, wherein the total weight of all aldimine-containing compounds of the formula (I) has a value of from 0.1 to 30% by weight, based on the weight of the composition.

12. The composition as claimed in claim 1, wherein the index q has a value >0.

13. The composition as claimed in claim 1, wherein the molar ratio between aldimino and isocyanate groups in the composition is 0.1-1.1.

14. A cured composition obtained by the reaction of water with a composition as claimed in claim 1.

15. A method for the adhesive bonding of substrates S1 and S2, comprising the steps:
applying the composition as claimed in claim 1 to the surface of the substrate S1,
bringing the surface of the substrate S2 into contact with the composition which is arranged on the substrate S1, and
curing of the composition by contact with moisture,
the substrates S1 and S2 being identical to or different from one another.

16. A method for sealing, comprising the steps
applying the composition as claimed in claim 1 between the surfaces of a substrate S1 and a substrate S2, and
curing of the composition by contact with moisture,
the substrates S1 and S2 being identical to or different from one another.

17. The method as claimed in claim 15, wherein at least one of the substrates S1 or S2 is a glass, glass ceramic, concrete, mortar, baked brick, brick, gypsum, natural stone; metal or metal alloy; paint or finish.

18. An adhesively bonded article which is produced by means of a method for adhesive bonding as claimed in claim 15.

19. The adhesively bonded article as claimed in claim 18, wherein the article is a means of transport, or a part thereof.

20. A sealed article which is produced by means of a method for sealing as claimed in claim 16.

21. The sealed article as claimed in claim 20, wherein the article is a means of transport or a structure.

* * * * *